(12) United States Patent
Hiramoto et al.

(10) Patent No.: US 8,253,818 B2
(45) Date of Patent: Aug. 28, 2012

(54) PIXEL SHIFT TYPE IMAGING DEVICE

(75) Inventors: Masao Hiramoto, Osaka (JP); Yoshiaki Sugitani, Nara (JP); Teruyuki Takizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 330 days.

(21) Appl. No.: 12/745,366

(22) PCT Filed: Sep. 18, 2009

(86) PCT No.: PCT/JP2009/004774
§ 371 (c)(1),
(2), (4) Date: May 28, 2010

(87) PCT Pub. No.: WO2010/038378
PCT Pub. Date: Apr. 8, 2010

(65) Prior Publication Data
US 2010/0309329 A1    Dec. 9, 2010

(30) Foreign Application Priority Data

Oct. 2, 2008 (JP) ................................ 2008-257092
Oct. 10, 2008 (JP) ................................ 2008-263864

(51) Int. Cl.
*H04N 5/228* (2006.01)
*H04N 3/14* (2006.01)
(52) U.S. Cl. .................. 348/222.1; 348/229.1; 348/239
(58) Field of Classification Search .................. 348/248, 348/239, 222.1, 229.1, 272, 275
See application file for complete search history.

(56) References Cited

U.S. PATENT DOCUMENTS

| 4,602,289 | A  | * | 7/1986  | Sekine ........................ 348/315 |
| 6,831,692 | B1 | * | 12/2004 | Oda ............................. 348/315 |
| 7,551,217 | B2 | * | 6/2009  | Oda et al. ................... 348/315 |

(Continued)

FOREIGN PATENT DOCUMENTS

JP      58-137247       8/1983

(Continued)

OTHER PUBLICATIONS

International Search Report for corresponding International Application No. PCT/JP2009/004774 mailed Oct. 27, 2009.

(Continued)

*Primary Examiner* — Hung Lam
(74) *Attorney, Agent, or Firm* — Renner, Otto, Boisselle & Sklar, LLP

(57) ABSTRACT

A solid-state imaging device according to the present invention includes, on an imaging surface, a plurality of unit pixel regions being arrayed at a first pixel pitch along a Y direction and at a second pixel pitch along an X direction. One of two adjoining unit pixel regions 1 along the Y first direction includes a first photodetecting portion 1a having a first opening ratio, and the other includes a second photodetecting portion 1b having a second opening ratio which is lower than the first opening ratio. When the first photodetecting portion 1a is moved imaginarily by a first pixel pitch along the Y direction, the first photodetecting portion 1a covers the entire second photodetecting portion 1b. At this time, a portion of the first photodetecting portion 1a that does not cover the second photodetecting portion 1b functions as an imaginary third photodetecting portion. From a difference between signals output from the photodetecting portions 1a and 1b, an imaginary pixel signal which is in accordance with an amount of light entering the imaginary third photodetecting portion is obtained.

29 Claims, 16 Drawing Sheets

U.S. PATENT DOCUMENTS

| | | | |
|---|---|---|---|
| 7,952,623 B2 * | 5/2011 | Wada | 348/273 |
| 8,031,235 B2 * | 10/2011 | Wada | 348/222.1 |
| 8,139,129 B2 * | 3/2012 | Kozlowski | 348/275 |
| 2002/0145668 A1 | 10/2002 | Harada | |
| 2004/0032519 A1 | 2/2004 | Oda et al. | |
| 2006/0119726 A1 | 6/2006 | Oda et al. | |

FOREIGN PATENT DOCUMENTS

| | | |
|---|---|---|
| JP | 60-187187 | 9/1985 |
| JP | 63-284979 | 11/1988 |
| JP | 64-069160 | 3/1989 |
| JP | 04-298175 | 10/1992 |
| JP | 09-326961 | 12/1997 |
| JP | 2002-369104 | 12/2002 |
| JP | 2004-079747 | 3/2004 |
| JP | 2005-176040 | 6/2005 |
| JP | 2006-174404 | 6/2006 |
| JP | 4125927 | 5/2008 |

OTHER PUBLICATIONS

PCT/ISA/237 and a partial English translation for International Application No. PCT/JP2009/004774 dated Oct. 27, 2009.

* cited by examiner (A) δx=0　　　(B) δx=0.05　　　(C) δx=0.10

(A) $\delta_x = \delta_y = 0$ (B) $\delta_x = \delta_y = 0.05$ (C) $\delta_x = \delta_y = 0.10$ (D) $\delta_x = \delta_y = 0.15$ (E) $\delta_x = \delta_y = 0.20$ (F) $\delta_x = \delta_y = 0.25$ (A)

(B)

(C)

(A)

(B)

(C)

(A)

(B)

(C)

(A)

(B)

PIXEL SHIFT TYPE IMAGING DEVICE

TECHNICAL FIELD

The present invention relates to a so-called pixel shift technique for shifting the pixel positions of an imaging device to improve the resolution of an image which is obtained through imaging.

BACKGROUND ART

In recent years, there have been remarkable trends toward higher functions and higher performances of digital cameras and digital camcorders in which imaging devices such as CCDs and CMOSs are used. In particular, with the advance in semiconductor fabrication technology, high degrees of miniaturization are under way, and high degrees of integration are being attained, and an increase in the pixels of imaging devices from 1 million pixels to 10 million pixels is being made. On the other hand, in a production process of a multi-pixel imaging device, a higher pixel density induces more complicated production steps and a longer time for image quality checking, thus affecting the production yield and producibility.

Other than such multi-pixel based methods, higher-resolution images can also be obtained by a method of shifting the pixels of an imaging device, i.e., a so-called pixel shift technique. There are generally two kinds of pixel shift techniques. A first pixel shift technique consists in pixel shifts that involve shifts in positions within the image area, where, relative to a plurality of pixels which are periodically arrayed in an imaging surface of a solid-state imaging device, other pixels are placed so as to be shifted. A second pixel shift technique consists in dynamic pixel shifts, where at least one of an optical system and a solid-state imaging device of a two-dimensional square array is mechanically budged.

An example of the fundamental principles of the first pixel shift technique is described in Patent Document 1. In Patent Document 1, the first pixel shift technique is applied to a three-plate type color camera in which three imaging devices are used. This color camera adopts a configuration in which the pixels of an imaging device of green (G), which enjoys a high human luminous efficacy, are shifted by a 1/2 pitch along the horizontal direction in every other row, thus enhancing the resolution along the horizontal direction.

An example of shifting pixels not only along the horizontal direction but also along the vertical direction is shown in Patent Document 2. In a CCD imaging device of Patent Document 2, photodetecting portions corresponding to pixels are made into diamond shapes, and these are placed in a meandering shape. By disposing the pixels so as to be shifted by a 1/2 pitch of the pixels both along the horizontal direction and the vertical direction, the resolution along the horizontal and vertical directions is enhanced.

As for a dynamic pixel shift technique, an example of mechanically budging an optical system against an imaging device is described in Patent Document 3. In Patent Document 3, a translucent parallel-plate is placed between an imaging device and a lens. By swinging the parallel-plate relative to the optical axis, an optical image which is formed on the imaging device is budged, thus improving the resolution along the budging direction. An example of enhancing the resolution by budging the imaging device itself without moving the optical system is described in Patent Document 4. In this case, resolution is improved by using a piezoelectric element as the budging means, the amount of budging being a 1/2 pitch of the pixels.

Thus, in the conventional pixel shift techniques, through pixel placement or mechanical budging of the imaging device, pixels are shifted by a 1/2 pitch along the horizontal direction, or both horizontal and vertical directions, thus achieving an improved resolution. According to principles, if the opening ratio (pixel aperture ratio) of the photodetecting portions is 100%, the resolution will be increased twofold by shifting the pixels by a 1/2 pitch.

This will be described below with reference to FIG. 15 and equations. FIG. 15 is a graph showing a curve representing a relationship between the coordinate along a one-dimensional direction (X) of an image and a luminance value f(X), as well as a rectangular wave pulse waveform for sampling the luminance value. The horizontal axes X and t of the graph each represent distance from a certain reference point (e.g., the center of the imaging surface) along the horizontal direction. In the example of FIG. 15, with increasing X, the luminance value f(X) increases or decreases in sinusoidal waves.

One sampling pulse corresponds to one photodetecting portion. Although two sampling pulses are shown in FIG. 15, in actuality, a large number of sampling pulses exist. Herein, since the luminance value of an image which is formed on the imaging surface varies in sinusoidal waves along the X direction, the luminance value f(X) is expressed by eq. 1, using amplitude A, frequency $\omega$, and phase 0. The sampling pulses are represented by a pulse height of 1, a frequency $\omega s$, and a period (width) T.

$$f(X) = A \cos \omega X \quad [\text{eq. 1}]$$

Since the received light amount of one photodetecting portion with an opening ratio of 100% equals an integrated amount for one period of sampling pulses, the received light amount P(n) of an $n^{th}$ pixel is expressed by eq. 2. By dividing the calculation result of eq. 2 with one period T and expressing it in terms of an average over time, eq. 3 is obtained. However, in eq. 3, $B = 2A/\omega T$. Furthermore, from the relationship of $T\omega s = 2\pi$, eq. 3 is expressed as eq. 4.

$$P(n) = \int A \cos \omega t \, dt \, [t = -T/2 + nT \text{ to } T/2 + nT] \quad [\text{eq. 2}]$$

$$P(n) = B \sin(\omega T/2) \cos(\omega nT) \quad [\text{eq. 3}]$$

$$P(n) = B \sin(\pi \omega / \omega s) \cos(2\pi n \omega / \omega s) \quad [\text{eq. 4}]$$

By varying n=0, 1, 2, . . . in eq. 4, the signal amount of an $n^{th}$ pixel is known. According to the sampling theorem, it is when $\omega/\omega s \leq 1/2$ that this signal amount is guaranteed. When $\omega/\omega s > 1/2$, the signal difference from an adjoining pixel is small. When the value of $\omega/\omega s$ approaches one, the signals of an $n^{th}$ pixel and an $(n+1)^{th}$ pixel are substantially in phase, so that there is hardly any difference therebetween.

When the pixels are shifted by a 1/2 pitch, n=n+1/2. By substituting this into eq. 4, eq. 5 is obtained, which expresses a received light amount after the pixel shift. That is, even when the value of $\omega/\omega s$ approaches one, image information having a $\pi$ shifted in its phase, which was not obtained from eq. 4, can be obtained. It will be appreciated that, because $B \sin(\pi \omega / \omega s) = 0$ when $\omega/\omega s = 1$, there is no resolving power in this case; however, resolution is possible until the value of $\omega/\omega s$ is near one. Thus, it can be said that resolution can be increased nearly twofold by a pixel shift.

$$P(n+1/2) = B \sin(\pi \omega / \omega s) \cos(\pi (2n+1) \omega / \omega s) \quad [\text{eq. 5}]$$

In order to further confirm the above, simulation results of imaging a wedge-like resolution pattern while shifting the pixels by a 1/2 pitch, a 1/3 pitch, or a 1/4 pitch, where the photodetecting portion has an opening ratio of 100%, are shown in FIG. 16.

This simulation involves an imaging where the limit resolution along the horizontal direction in the case where no pixel shift is made is set to 200 lines. In FIG. 16, (A) shows an image where the pixels are shifted by a 1/2 pitch; (B) shows an image where the pixels are shifted by a 1/3 pitch, and (C) shows an image where the pixels are shifted by a 1/4 pitch. However, in the figure, in order to match the image size of (C), (A) and (B) are enlarged 2 times and 4/3 times, respectively, along the horizontal and vertical directions. From these results, it can be seen that the resolution is a little less than 400 lines in each case, which is an about twofold improvement from the limit resolution of 200 lines.

Thus, a pixel shift technique can improve resolution, but so long as the opening ratio is 100%, the resolution cannot be improved beyond twofold no matter how the pixel shift pitch is varied. Of course, the photosensitivity increases as the opening ratio increases. Therefore, in recent years, a microlens is provided on each pixel of the imaging device to increase the opening ratio to near 100%. However, from the standpoint of resolution improvement, not much improvement in image quality can be expected.

In such a situation, a technique for further improving the resolution is described in Patent Document 5. According to this technique, a pixel arrangement is adopted having a shift by a 1/2 pitch of the pixels along the horizontal direction and the vertical direction in the imaging surface. Furthermore, an opening having a minute opening ratio is provided at the center position between pixels, in order to obtain a photoelectric conversion signal also from such portions, thus further improving the resolution.

In this technique, the conventional pixel shift technique is adopted, and furthermore, minute openings are provided between pixels with some structural considerations. As a result, image information between pixels is obtained, whereby the resolution is commensurately improved. Other than resolution improvements, this technique also improves a so-called dynamic range because of being able to expand the luminance range for a subject to be imaged, with the minute openings and the photodetecting portions having usual openings.

Configurations having photodetecting portions with different opening ratios are also described in Patent Document 6 and Patent Document 7. According to these conventional techniques, images are reproduced by utilizing signals from the photodetecting portions having low opening ratios in a bright scene, and signals from the photodetecting portion having a high opening ratio in a dark scene, thus broadening the imaging conditions. In other words, the techniques disclosed in Patent Documents 6 and 7 are meant to improve the dynamic range in essence, and do not positively improve resolution.

Citation List

Patent Literature

Patent Document 1: Japanese Laid-Open Patent Publication No. 58-137247
Patent Document 2: Japanese Laid-Open Patent Publication No. 60-187187
Patent Document 3: Japanese Laid-Open Patent Publication No. 63-284979
Patent Document 4: Japanese Laid-Open Patent Publication No. 64-69160
Patent Document 5: Japanese Laid-Open Patent Publication No. 2004-79747 (Japanese Patent No. 4125927)
Patent Document 6: Japanese Laid-Open Patent Publication No. 4-298175
Patent Document 7: Japanese Laid-Open Patent Publication No. 2006-174404

SUMMARY OF INVENTION

Technical Problem

According to the conventional pixel shift techniques, resolution can be improved about twofold, but no more improvements are expectable. In order to obtain a further improved resolution, the number of pixels had to be increased, even with minute openings.

Therefore, the present invention aims to provide a pixel shift technique which improves resolution to more than a twofold value, which has not been realized with conventional pixel shift techniques.

Solution to Problem

A pixel-shift type imaging apparatus according to the present invention is a pixel-shift type imaging apparatus comprising: a solid-state imaging device; an optical system for forming an image on an imaging surface of the solid-state imaging device; a pixel shift section for shifting a position of the image on the imaging surface; and a video signal processing section for processing an electrical signal output from the solid-state imaging device, wherein, the solid-state imaging device includes a plurality of unit pixel regions being arrayed on the imaging surface at a first pixel pitch along a first direction, and at a second pixel pitch along a second direction which intersects the first direction; one of two adjoining unit pixel regions along the first direction includes a first photodetecting portion having a first opening ratio, and the other of the two unit pixel regions includes a second photodetecting portion having a second opening ratio which is lower than the first opening ratio; the first photodetecting portion outputs a first pixel signal which is in accordance with an amount of light entering the first photodetecting portion, and the second photodetecting portion outputs a second pixel signal which is in accordance with an amount of light entering the second photodetecting portion; when the first photodetecting portion is moved imaginarily by the first pixel pitch along the first direction, the first photodetecting portion covers the entire second photodetecting portion, and a portion of the imaginarily-moved first photodetecting portion that does not cover the second photodetecting portion functions as an imaginary third photodetecting portion; and from a difference between the first pixel signal and the second pixel signal, the video signal processing section obtains an imaginary pixel signal which is in accordance with an amount of light entering the imaginary third photodetecting portion.

In a preferred embodiment, when the first photodetecting portion is shifted by the first pixel pitch along the first direction, a center of the second photodetecting portion is offset by a distance δ from a center of the shifted first photodetecting portion along the second direction.

In a preferred embodiment, one of two edges of the second photodetecting portion that are parallel to the first direction is on one of lines which are extensions in the first direction of two edges of the first photodetecting portion that are parallel to the first direction.

In a preferred embodiment, the pixel shift section shifts the position of the image on the imaging surface along the second direction by a distance which is equal to or greater than a half of the distance δ.

In a preferred embodiment, the pixel shift section shifts the position of the image on the imaging surface along the second direction by a distance which is equal to or less than a half of the second pixel pitch.

In a preferred embodiment, the pixel shift section shifts the position of the image on the imaging surface along the second direction by a distance which is equal to or less than a half of a width of the second photodetecting portion.

In a preferred embodiment, the pixel shift section shifts the position of the image on the imaging surface along the first direction by a half of the first pixel pitch.

In a preferred embodiment, the pixel shift section shifts the position of the image on the imaging surface along the first direction, alternately by the first pixel pitch or by a half of the first pixel pitch.

In a preferred embodiment, the pixel shift section shifts the position of the image on the imaging surface in a direction which is oblique to both the first direction and the second direction.

In a preferred embodiment, when the first photodetecting portion is shifted by the first pixel pitch along the first direction, a center of the second photodetecting portion is offset from a center of the shifted first photodetecting portion by $\delta X$ along the second direction and by $\delta Y$ along the first direction.

In a preferred embodiment, the pixel shift section shifts the position of the image on the imaging surface, by a distance Y1 which is equal to or greater than a half of the distance $\delta Y$ and equal to or less than a half of the first pixel pitch along the first direction, and by a distance X1 which is equal to or greater than a half of the distance $\delta X$ and equal to or less than a half of the second pixel pitch along the second direction.

In a preferred embodiment, the pixel shift section shifts the position of the image on the imaging surface, by the distance Y1 plus the first pixel pitch along the first direction, and by the distance X1 plus the second pixel pitch along the second direction.

In a preferred embodiment, the first photodetecting portion and the second photodetecting portion are placed so that a center of the second photodetecting portion coincides with a center of the shifted first photodetecting portion when the first photodetecting portion is shifted by the first pixel pitch along the first direction; the pixel shift section shifts the position of the image on the imaging surface in a third direction which is oblique to both the first direction and the second direction; with the shift along the third direction by the pixel shift section, the first photodetecting portion covers the entire second photodetecting portion, and a portion of the first photodetecting portion that does not cover the second photodetecting portion is formed in only one region, the region functioning as an imaginary pixel; and the video signal processing section generates a high definition signal based on differences between the first pixel signal and the second pixel signal obtained before and after the shift by the pixel shift section and on the second pixel signal.

In a preferred embodiment, assuming that a width of the first photodetecting portion along the second direction is W1a and that a width of the second photodetecting portion along the second direction is W1b, the shift by the pixel shift section along the third direction causes the position of the image on the imaging surface to move along the first direction, and also move by a distance defined as (W1a−W1b)/2 along the second direction.

In a preferred embodiment, assuming that a length of the first photodetecting portion along the first direction is T1a and that a length of the second photodetecting portion along the first direction is T1b, the shift by the pixel shift section along the third direction causes the position of the image on the imaging surface to move by distance defined as (T1a−T1b)/2 along the first direction and also move along the first direction.

In a preferred embodiment, assuming that a width of the first photodetecting portion along the second direction is W1a and that a width of the second photodetecting portion along the second direction is W1b (W1a>W1b), when W1b is not equal to W1a/2, the pixel shift section shifts the position of the image on the imaging surface by W1a/2 along the second direction, in addition to the shift along the third direction.

In a preferred embodiment, the pixel shift section periodically repeats shifts along the third direction.

In a preferred embodiment, the solid-state imaging device has an array of microlenses for adjusting opening ratios and positions of the first photodetecting portion and the second photodetecting portion.

A solid-state imaging device according to the present invention is a solid-state imaging device having a plurality of unit pixel regions being arrayed on an imaging surface at a first pixel pitch along a first direction, and at a second pixel pitch along a second direction which intersects the first direction, wherein, one of two adjoining unit pixel regions along the first direction includes a first photodetecting portion having a first opening ratio, and the other of the two unit pixel regions includes a second photodetecting portion having a second opening ratio which is lower than the first opening ratio; the first photodetecting portion outputs a first pixel signal which is in accordance with an amount of light entering the first photodetecting portion, and the second photodetecting portion outputs a second pixel signal which is in accordance with an amount of light entering the second photodetecting portion; and when the first photodetecting portion is moved imaginarily by the first pixel pitch along the first direction, the first photodetecting portion covers the entire second photodetecting portion.

In a preferred embodiment, a portion of the first photodetecting portion moved imaginarily by the first pixel pitch along the first direction that does not cover the second photodetecting portion functions as an imaginary third photodetecting portion; and an imaginary pixel signal which is in accordance with an amount of light entering the imaginary third photodetecting portion is obtained from a difference between the first pixel signal and the second pixel signal.

In a preferred embodiment, the first photodetecting portion and the second photodetecting portion are positioned so that, when the first photodetecting portion is shifted by the first pixel pitch along the first direction, a center of the shifted first photodetecting portion does not coincide with a center of the second photodetecting portion.

In a preferred embodiment, when the first photodetecting portion is shifted by the first pixel pitch along the first direction, a center of the second photodetecting portion is offset by a distance $\delta$ from a center of the shifted first photodetecting portion along the second direction.

In a preferred embodiment, when the first photodetecting portion is shifted by the first pixel pitch along the first direction, a line connecting the center of the shifted first photodetecting portion and the center of the second photodetecting portion is not parallel to the first direction.

A pixel-shift type imaging apparatus according to the present invention is a pixel-shift type imaging apparatus comprising: a splitter for splitting light from a subject to at least two optical paths including a first optical path and a second optical path; a first solid-state imaging device for performing imaging at a first definition, with light traveling through the first optical path; a second solid-state imaging device for performing imaging at a second definition which is higher than the first definition, with light traveling through the second optical path; matching means for associating a first image obtained by the first solid-state imaging device with a second image obtained by the second solid-state imaging device on a pixel-by-pixel basis; a pixel shift section for shifting a position of an image on an imaging surface of each solid-state imaging device, wherein, pixel regions based on differences in opening between pixels as associated by the matching means are defined as imaginary pixels, and an amount of move of the imaginary pixels by the pixel shift section includes a 1/2 pitch or 3/2 pitches of the imaginary pixels.

In a preferred embodiment, the first imaging device includes pixels being arrayed with a first density; and the second imaging device includes pixels being arrayed with a second density which is higher than the first density.

A preferred embodiment comprises a first optical system having a first magnification in the first optical path, and a second optical system having a magnification which is smaller than the first magnification in the second optical path.

In a preferred embodiment, the first definition: the second definition is n:m (where n and m are different positive integer; n<m).

In a preferred embodiment, the amount of move of the imaginary pixels is 1/2 times as large as a pitch of the imaginary pixels along a direction of move.

In a preferred embodiment, the amount of move of the imaginary pixels is 1/2 times, or 1/2 times and 3/2 times as large as a pitch of the imaginary pixels in a direction of move.

Advantageous Effects of Invention

In accordance with a pixel-shift type imaging apparatus of the present invention, at least two kinds of photodetecting portions having different opening ratios are provided, and, from a difference in opening therebetween, an imaginary photodetecting portion is created which has a smaller opening than those of the photodetecting portions. By budging the imaginary photodetecting portion, a high definition signal along the direction of budging can be obtained.

DESCRIPTION OF EMBODIMENTS

Figure 1:
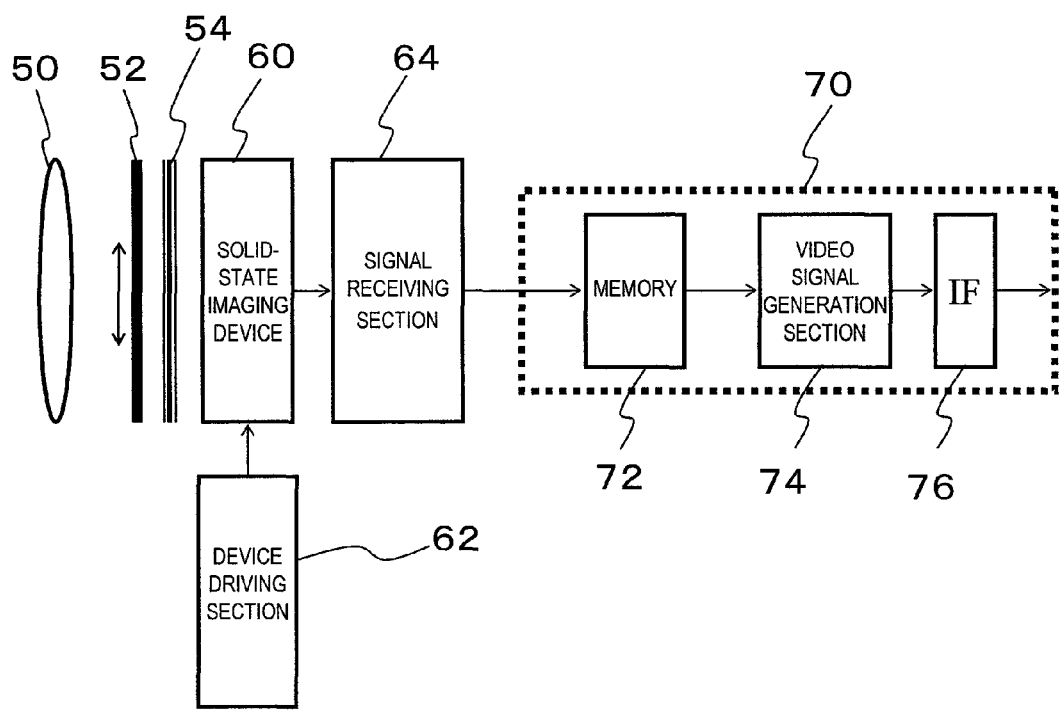
[FIG. 1] A diagram showing an exemplary basic construction of a pixel-shift type imaging apparatus according to the present invention

As illustrated in FIG. 1, a pixel-shift type imaging apparatus according to the present invention includes a solid-state imaging device 60, an optical system (lens 50) for forming an image on an imaging surface of the solid-state imaging device 60, a pixel shift section 52 for shifting the position of the image on the imaging surface, and a video signal processing section 70 for processing an electrical signal which is output from the solid-state imaging device 60.

For example, the pixel shift section 52 includes a transparent glass plate whose thickness varies in an in-plane direction, such that this transparent glass is budged along a direction which is parallel to the imaging surface (e.g., horizontal direction). In the example of FIG. 1, an optical low-pass filter 54, e.g. a quartz plate, is placed between the pixel shift section 52 and the solid-state imaging device 60. The configuration and action of a signal receiving section 64 and the video signal processing section 70 will be described later.

Figure 2:
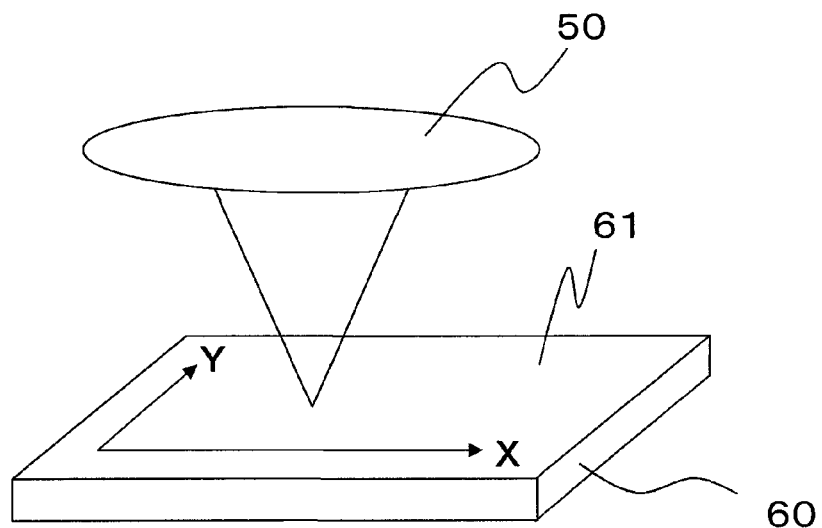
[FIG. 2] A perspective view showing an imaging surface of a solid-state imaging device

The most characteristic constituent element of the present invention is the solid-state imaging device 60. Hereinafter, with reference to FIG. 2 and FIG. 3, the fundamental configuration of the solid-state imaging device according to the present invention will be described. FIG. 2 is a perspective view schematically showing how an image is formed by the lens 50 on an imaging surface 61 of the solid-state imaging device 60. Any position on the imaging surface 61 can be expressed by coordinates on the X axis and the Y axis intersecting each other.

Figure 3:
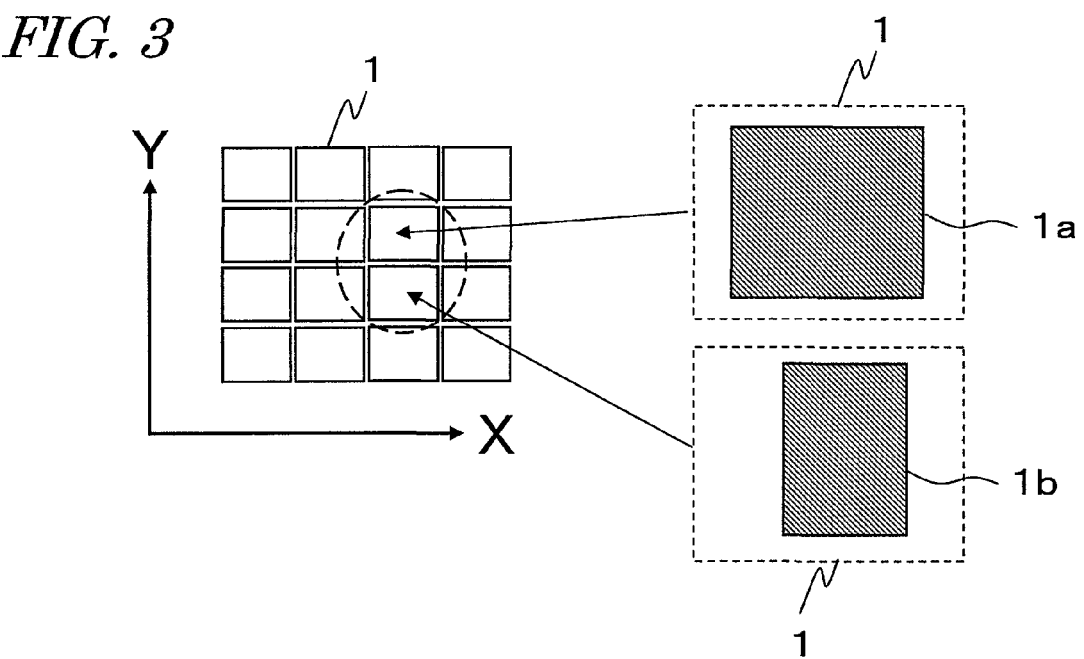
[FIG. 3] An enlarged view showing a part of an imaging surface of a solid-state imaging device

As shown in FIG. 3, the solid-state imaging device 60 has a plurality of unit pixel regions 1 which are arrayed on the imaging surface 61. The unit pixel regions 1 are arrayed at a first pixel pitch along the Y axis direction (first direction) in FIG. 2, and arrayed at a second pixel pitch along the X axis direction (second direction) intersecting the first direction.

Now, among the multitude of unit pixel regions 1, attention will be paid to two adjoining unit pixel regions 1 along the vertical direction (Y axis direction). As shown on the right-hand side of FIG. 3, one of the two unit pixel regions 1 includes a first photodetecting portion 1a having a first opening ratio. The other of the two unit pixel regions 1 includes a second photodetecting portion 1b having a second opening ratio which is lower than the first opening ratio. The photodetecting portions 1a and 1b are composed of photodiodes.

The first photodetecting portion 1a outputs a first pixel signal which is in accordance with the amount of light entering the first photodetecting portion 1a, whereas the second photodetecting portion 1b outputs a second pixel signal which is in accordance with the amount of light entering the second photodetecting portion 1b. When light of a uniform intensity is entering the plurality of unit pixel regions 1, the first pixel signal output from the first photodetecting portion 1a has a greater amplitude than that of the second pixel signal output from the second photodetecting portion 1b. This is because the first photodetecting portion 1a has an opening ratio which is greater than the opening ratio of the second photodetecting portion 1b.

In the present specification, an opening ratio is a ratio of the area of one photodetecting portion 1a or 1b to the area of one unit pixel region 1. By providing a microlens (not shown) on a photodetecting portion, it is possible to increase the opening ratio of that photodetecting portion to 100%.

In the present invention, as shown in FIG. 3, the layout of the photodetecting portions 1a and 1b is designed so that, when the first photodetecting portion 1a is moved imaginarily by the first pixel pitch along the vertical direction, the first photodetecting portion 1a will cover the entire second photodetecting portion 1b.

Hereinafter, with reference to the drawings, Embodiments of the present invention will be described. In all figures, like elements are denoted by like numerals.

(Embodiment 1)

Figure 4:
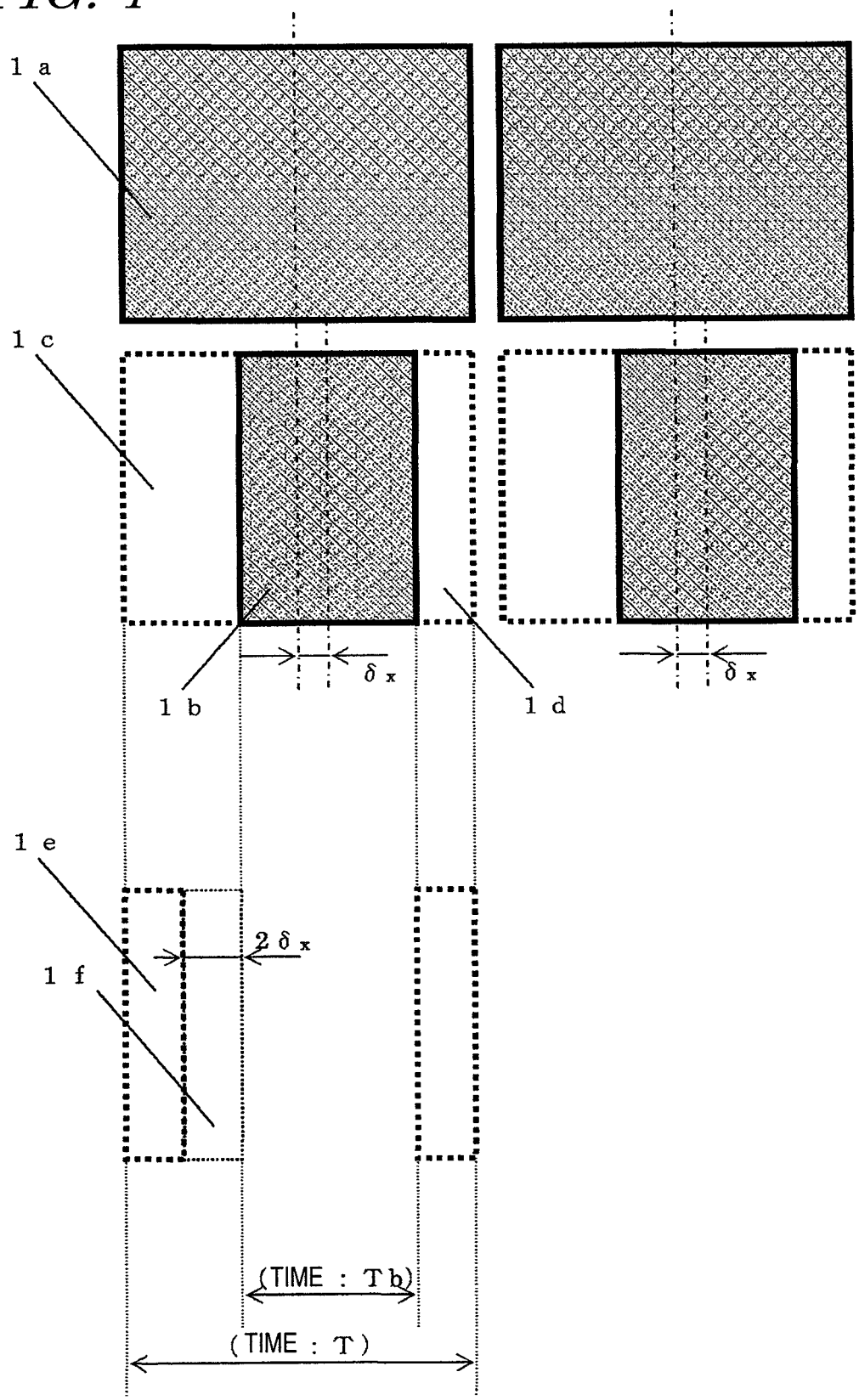
[FIG. 4] A plan view showing a basic two-row-by-two-column arrangement of imaging device photodetecting portions according to Embodiment 1 of the present invention

FIG. 4 is a plan view showing a basic arrangement of photodetecting portions of the imaging device according to Embodiment 1 of the present invention. Although FIG. 4 only shows four adjoining unit pixel regions, a multitude of unit pixel regions are arrayed on the imaging surface of an actual imaging device. In the present embodiment as well as each of the embodiments described later, a multitude of photodetecting portions are placed in a two-dimensional array, where two rows by two columns of photodetecting portions define a basic construction. Stated otherwise, on the actual imaging surface, groups of four photodetecting portions (pixel basic set) as shown in FIG. 4 are periodically arrayed along the horizontal direction and the vertical direction. Note that the horizontal direction in FIG. 4 corresponds to the X axis direction in FIG. 2 and FIG. 3, whereas the vertical direction in FIG. 4 corresponds to the Y axis direction in FIG. 2 and FIG. 3.

In FIG. 4, the distance between the centers of two adjoining unit pixel regions along the vertical direction is the pixel pitch (first pixel pitch) along the vertical direction. Moreover, the distance between the centers of two adjoining unit pixel regions along the horizontal direction is the pixel pitch (second pixel pitch) along the vertical direction. This also holds true in any other embodiment.

In the present embodiment, as shown in FIG. 4, photodetecting portions (opening ratio 100%) 1a having a relatively high opening ratio are placed at unit pixel regions in the 1st row and the 1st column and in the 1st row and the 2nd column within the pixel basic set. The photodetecting portions 1b having a relatively low opening ratio, whose opening is narrowed along the horizontal direction, are placed at unit pixel regions in the 2nd row and the 1st column and in the 2nd row and the 2nd column within the pixel basic set. Moreover, the relative positioning of a photodetecting portion 1a and a photodetecting portion 1b is such that the center of the photodetecting portion 1b is offset by δX from the center of the photodetecting portion 1a along the horizontal direction. In other words, if the photodetecting portion 1a is shifted by 1 pixel pitch along the vertical direction, the center of the shifted photodetecting portion 1a and the center of the photodetecting portion 1b do not coincide, but are offset by δX along the horizontal direction.

The present invention utilizes the difference in opening ratio between the photodetecting portions of the pixels for an improved resolution. Usually, if the pixels are finely shifted while reducing their opening ratio, the resolution will be improved, but the sensitivity will be lowered due to the reduced opening ratio. Therefore, according to the present invention, the opening ratio of only some of the photodetecting portions is reduced. Then, based on the difference from the other photodetecting portions, imaginary photodetecting portions having a low opening ratio are created, and the imaginary photodetecting portions are shifted, thereby obtaining an improved resolution.

Figure 15:
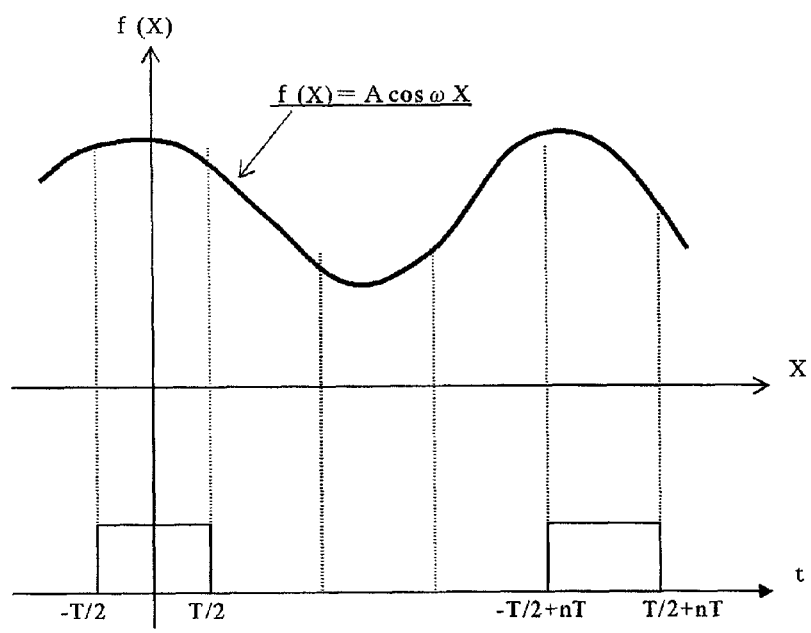
[FIG. 15] A diagram showing a graph representing a relationship between the coordinate along a one-dimensional direction (X) of an image and a luminance value f(X), with rectangular-wave pulses for sampling the luminance value being overlaid thereon
Figure 16:
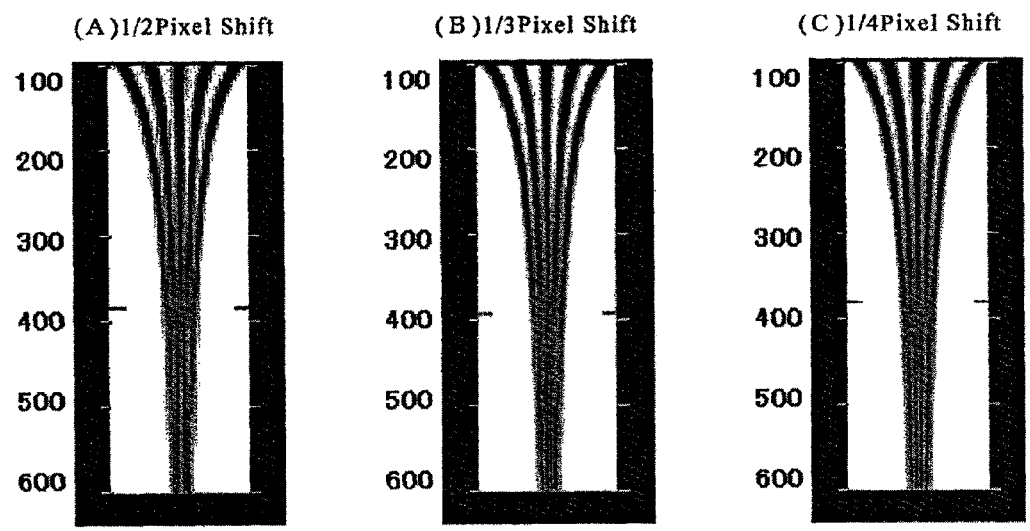
[FIG. 16] (A) to (C) are diagrams showing results of a resolution simulation in which a wedge-like resolution pattern is imaged while shifting the pixels by a 1/2 pitch, a 1/3 pitch, or a 1/4 pitch, where the photodetecting portions has an opening ratio (pixel aperture ratio) of 100%

Now, a pixel shift of a photodetecting portion whose opening size has become 1/m along the X direction will be discussed, with reference to FIG. 15. It is assumed that m is a value exceeding 1. In this case, the opening ratio of this photodetecting portion is reduced to 1/m. In order to determine a light amount received by such a photodetecting portion, the range of the integrated period in eq. 2 may be set to t=−T/2m+nT to T/2m+nT. Herein, T is the X direction size (width) of the unit pixel region 1, which corresponds to the width of a pulse shown in FIG. 15.

Using the relationship Tωs=2π, the received light amount P(n) of an $n^{th}$ pixel is expressed by eq. 6. Assuming that an m-times harmonic of the frequency ω is mω, by substituting mω for ω in eq. 6, eq. 7 is obtained. In this case, by replacing n with n(1+k/2m), and substituting it into eq. 7, eq. 8 is obtained. Herein, k is an integer such that k=1 to 2m−1. In other words, with a shift of a 1/2m pitch each, information with a phase which is shifted by about π is also obtained, so that the resolution is improved 2m-fold.

$P(n)=B \sin(\pi(\omega/m)/\omega s)\cos(2\pi n\omega/\omega s)$ [eq. 6]

$P(n)=B \sin(\pi\omega/\omega s)\cos(2\pi nm\omega/\omega s)$ [eq. 7]

$P(n+k/2m)=B \sin(\pi\omega/\omega s)\cos(2\pi mn(1+k/2m)\omega/\omega s)$ [eq. 8]

Next, the received light amount of a photodetecting portion 1*b* according to Embodiment 1 of the present invention is determined. For a photodetecting portion 1*a* having an opening ratio 100%, the received light amount P(n) of an $n^{th}$ pixel is expressed by eq. 3. On the other hand, since the width along the horizontal direction of the photodetecting portion 1*b* is narrow, the width of a corresponding integrated period is assumed to be Tb. Moreover, the offset amount of the center of the photodetecting portion 1*b* from the center of the unit pixel region is assumed to be δ. In this case, the received light amount P(n) of the photodetecting portion 1*b* is expressed by eq. 9.

$$P(n)=B\sin(\omega Tb/2)\cos(\omega(nT-\delta)) \qquad [\text{eq. 9}]$$

In the present embodiment, due to the difference in opening between a photodetecting portion 1*a* and a photodetecting portion 1*b* which are arrayed along the vertical direction, the resolution along the horizontal direction can be improved. What is characteristic of the present embodiment is that the center of opening of the photodetecting portion 1*a* and the center of opening of the photodetecting portion 1*b* are not on the same line that extends along the vertical direction. A total of the received light amounts of an imaginary opening 1*c* and an imaginary opening 1*d* created from differences between the photodetecting portion 1*a* and the photodetecting portion 1*b* is the signal of the imaginary pixels, as expressed by eq. 10.

$$P(n)=B(\sin(\omega T/2)\cos(\omega nT)-\sin(\omega Tb/2)\cos(\omega(nT-\delta))) \qquad [\text{eq. 10}]$$

Eq. 10 is further transformed into eq. 11. On the right-hand side in eq. 11, the first term and the second term, and the third term and the fourth term, may be summarized as eq. 12 and eq. 13, whereby eq. 11 is expressed as eq. 14.

$$P(n) = B[\sin(\omega T/2)\cos(\omega nT) - \sin(\omega Tb/2)\cos(\omega nT) + \sin(\omega Tb/2)\cos(\omega nT) - \sin(\omega Tb/2)\cos(\omega(nT - \delta))] \qquad [\text{eq. 11}]$$

$$Z1 = (\sin(\omega T/2) - \sin(\omega Tb/2)\cos(\omega nT) = 2\cos(\omega(T + Tb)/2)\sin(\omega(T - Tb)/2)\cos(\omega nT) \qquad [\text{eq. 12}]$$

$$Z2 = \sin(\omega Tb/2)(\cos(\omega nT) - \cos(\omega(nT - \delta))) = -2\sin(\omega Tb/2)\sin(\omega(nT - \delta/2))\sin(\omega\delta/2) \qquad [\text{eq. 13}]$$

$$P(n) = B(Z1 + Z2) \qquad [\text{eq. 14}]$$

Herein, Z1 expressed by eq. 12 does not contain the offset amount δ between the centers Opening of the photodetecting portions 1*a* and 1*b*, and therefore corresponds to a total of the received light amounts of imaginary openings 1*e* and 1*d* in FIG. 4. Since Z1 contains (T−Tb), this enhances the resolution due to the pixel shift. However, since Z1 also contains (T+Tb), the resolution is actually lowered due to the influence of the latter. Note that, in FIG. 4, the region 1*e* is a portion of the imaginary opening 1*c* having the same area as that of the region 1*d*, whereas a region 1*f* is an imaginary opening related to the offset amount δX between the centers of opening.

On the other hand, Z2 expressed by eq. 13 contains δ, and therefore corresponds to the received light amount of the imaginary opening 1*f*. In this case, since sin(ωTb/2) and sin(ωδ/2) are contained, ωb=2π/Tb is first assumed. Then, the resolution limit associated with sin(πω/ωb) is ωb/2. Furthermore, by performing a pixel shift with a pitch corresponding to Tb/2, the resolution limit is improved to near ωb.

By also assuming ωd=2π/δ, the resolution limit associated with sin(πω/ωd) is ωd/2. By further performing a pixel shift with a pitch corresponding to δ/2, the resolution limit is improved to near ωd. All in all, assuming that δ≦Tb, if the amount of pixel shift is in a range corresponding to no less than δ/2 and no more than Tb/2, the resolution can be improved to at least near ωb.

The above results indicate that, concerning the resolution improvement due to a pixel shift along the horizontal direction, Z1 decreases the resolution. However, Z2 produces an about T/Tb-fold improvement in resolution, by introducing a slight offset between the centers of opening of the photodetecting portion 1*a* and the photodetecting portion 1*b*. Conventionally, a near-twofold improvement is obtained with a pixel shift technique corresponding to T/2. The present invention enables at least a (T/Tb)-fold improvement from there. Since T/Tb>1, the resolution can be improved more than twofold according to the present invention, thus producing effects which are not conventionally available.

Next, a simulation of a pixel shift according to the present embodiment was performed. The horizontal width T of the photodetecting portion 1*a* shown in FIG. 4 was assumed to be 1 (opening ratio 100%); the horizontal width Tb of the photodetecting portion 1*b* was assumed to be 0.8 (opening ratio 80%); and δX was varied between 0, 0.05, and 0.10. Herein, the unit of horizontal length is defined so that the pixel pitch along the horizontal direction is 1. For example, "δX=0.05" means that δX has a length which is 0.05 times as large as the pixel pitch along the horizontal direction. Moreover, to "perform a pixel shift by 0.25 pitches", for example, means "budging the position of an image on the imaging surface so as to shift the relative positioning between the image and the pixels by a distance which is 0.25 times as large as the pixel pitch along the horizontal direction".

In this simulation, for a wedge-like resolution pattern, results were obtained with respect to an imaging which was performed with a shift by 1 pixel pitch along the vertical direction, and an imaging which was performed with a pixel shift with the following horizontal pitches. These results are shown in FIG. 5.

In this simulation, the limit resolution along the horizontal direction in the case of not performing a pixel shift is set to 200 lines. In this simulation, since δ is considerably small relative to the horizontal width of the photodetecting portion 1*b*, no pixel shift pitch that is based on the imaginary opening 1*f* is adopted. A horizontal pixel shift was performed with 0.25 pitches, which satisfies being less than 1/2 of the horizontal width Tb(0.8) of the photodetecting portion 1*b*, and an image was displayed only with signals from the imaginary openings 1*c* and 1*d*.

As for the operation and signal processing of this pixel shift, the following steps are repeatedly performed: (1) imaging 1; (2) a move along the vertical direction by one 1 pixel pitch; (3) imaging 2; (4) subtraction between the signal from imaging 1 and the signal from imaging 2; and (5) a horizontal pixel shift.

Figure 5:
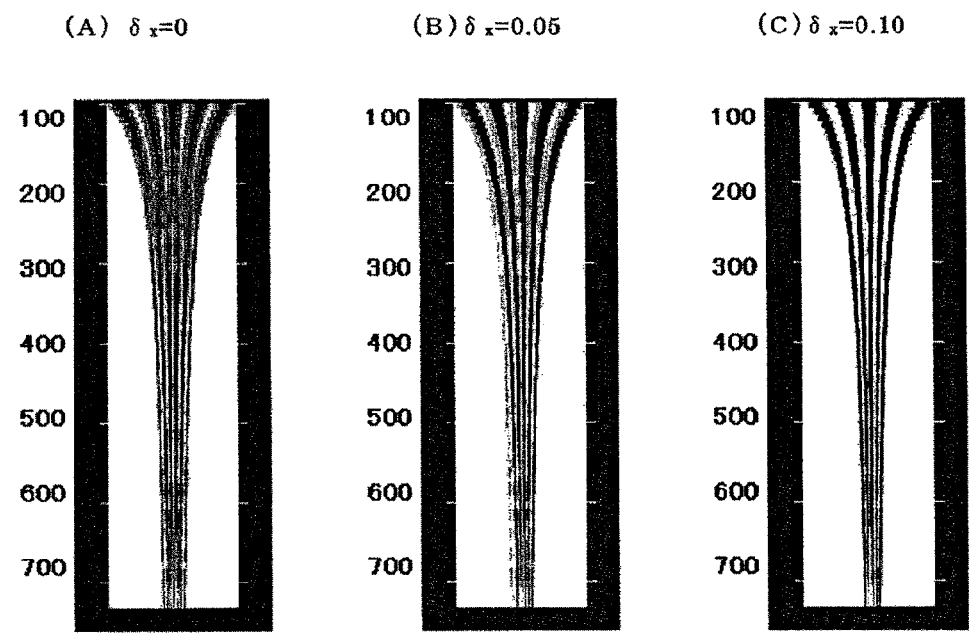
[FIG. 5] (A) to (C) are diagrams showing resolution results when a wedge-like resolution pattern is imaged, according to Embodiment 1 of the present invention

In FIG. 5, (A) shows a result in the case where δX=0, where there is only the influence of Z1 mentioned above. In this case, the resolution just exceeds 200 lines, and not much effect of the pixel shift is observed. As this result indicates, the resolution is lower than that in a conventional 1/2 pitch pixel shift. FIG. 5(B) shows a result in the case where δX=0.05, with Z2 being added to Z1. It can be seen that, with only a slight change in the centers of opening of the photodetecting portions, the resolution is improved to 600 lines or more. FIG. 5(C) shows the case δX=0.10, where the imaginary opening 1*d* has disappeared and there is only 1*c*, indicative of a further improved resolution. The present embodiment is characterized in that δX is not 0, and it can be seen that a great improvement in resolution can be achieved as in the cases of FIGS. 5(B) and (C) of this simulation.

Thus, in Embodiment 1 of the present invention, a configuration is adopted where two kinds of photodetecting portions with different opening ratios are respectively placed in every other row, such that the centers of opening of the two kinds of photodetecting portions along the horizontal direction are offset. The present embodiment provides an effect in that, with difference signals between two pixels with different opening ratios, a high-definition signal having an improved resolution along the horizontal direction is obtained.

Note that, according to Embodiment 1 of the present invention, with the action of the pixel shift section, the position of an image on the imaging surface is shifted by 1 pixel along the vertical direction, i.e., the photodetecting portion 1a and the photodetecting portion 1b are overlaid at the same portion within an image, thus obtaining signal differences between the two pixels. Specifically, by shifting the image on the imaging surface by 1 pixel along the vertical direction, luminance signals concerning the same portion of the image are acquired from the photodetecting portion 1a and the photodetecting portion 1b. However, so long as the luminance of an image which is formed on the imaging surface is uniform (i.e., does not vary) along the vertical direction within a region having a size of at least about the pixel pitch, there is no need to shift the position of an image on the imaging surface by 1 pixel. In other words, signal differences between pixels may be created by using signals which are obtained at the same time from the adjoining photodetecting portion 1a and photodetecting portion 1b along the vertical direction.

The signal receiving section 64 in FIG. 1 receives a signal from the solid-state imaging device 60, and sends it to the video signal processing section 70. The video signal processing section 70 includes an image memory 72 for storing the signal which is received from the signal receiving section 64, a video signal generation section 72 for generating a video signal (high definition signal) from the data which is read from the image memory 72, and an interface (IF) section 76 for outputting a video signal to the exterior.

The high definition signal which is obtained by the above-described method may be utilized as it is. Alternatively, it may be added to a result of signal Processing which has a low resolution but a high sensitivity, without losing its effect.

In the present embodiment, photodetecting portions having the same opening ratio are placed in each row on the imaging surface. However, in the basic construction shown in FIG. 4, there is no problem in swapping the photodetecting portions between the 1st row and 2nd column and the 2nd row and 2nd column. In the present embodiment, it is assumed that the photodetecting portions having a broad opening have an opening ratio of 100%, but this is not a limitation. Moreover, a configuration may be adopted in which a photodetecting portion having a broad opening and a photodetecting portion having a narrow opening are adjusted so that their total opening ratio is 200%. By doing so, the decrease in the overall sensitivity can also be prevented.

(Embodiment 2)

Figure 6:
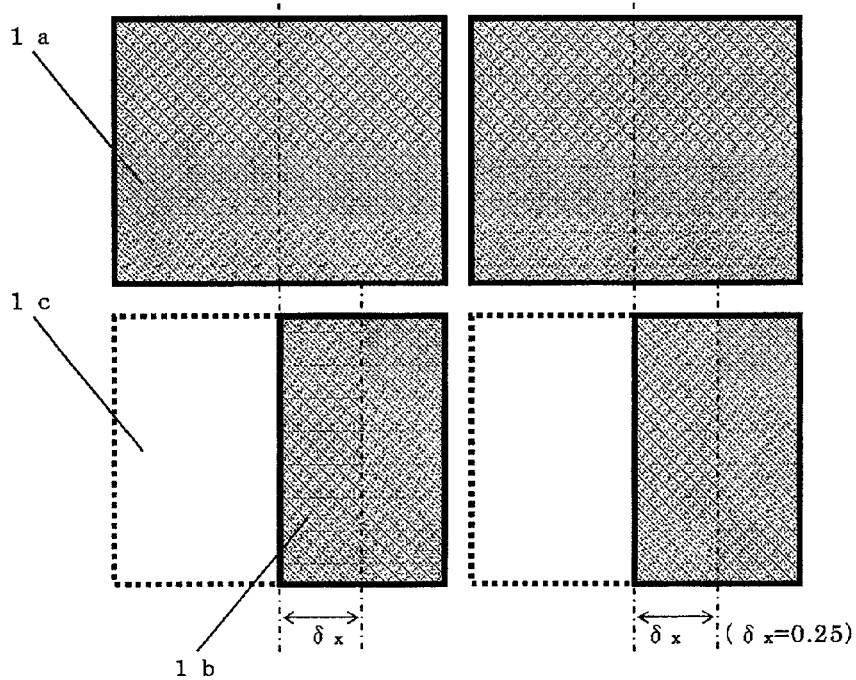
[FIG. 6] A plan view showing a basic two-row-by-two-column arrangement of imaging device photodetecting portions according to Embodiment 2 of the present invention

Next, with reference to FIG. 6, a second embodiment will be described. FIG. 6 is a plan view showing a basic arrangement of photodetecting portions according to Embodiment 2 of the present invention. In the present embodiment, basic constructions of two rows by two columns are placed in a two-dimensional array. In this figure, photodetecting portions 1a having an opening ratio of 100% are placed in the 1st row and the 1st column and in the 1st row and the 2nd column. Photodetecting portions 1b having an opening ratio of 50% are placed in the 2nd row and the 1st column and in the 2nd row and the 2nd column. Moreover, the relative positioning of the photodetecting portions 1a and the photodetecting portions 1b is such that the right ends of the photodetecting portions are at the same position along the horizontal direction. Therefore, with respect to the center of opening of a photodetecting portion 1a, the center of opening of a photodetecting portion 1b is offset by 0.25 pitches ($\delta X=0.25$) along the horizontal direction.

In the present embodiment, there is no imaginary opening 1d as shown in FIG. 4 in Embodiment 1, but only imaginary openings 1c are created. In such a pixel arrangement, as in the case of Embodiment 1, a high-definition signal is generated through differential processing of signals, from two adjoining pixels along the vertical direction, while shifting the pixels along the horizontal direction. The received light amount P(n) of a pixel is determined by assuming $\delta=(T-Tb)/2$ in eq. 10, the result thereof being expressed by eq. 15.

$$P(n)=B(\sin(\omega(T-Tb)/2)\cos(\omega(nT-Tb/2))) \qquad [\text{eq. 15}]$$

In the case of a pixel shift, the resolution performance is determined as $\sin(\omega(T-Tb)/2)$. Therefore, by performing a pixel shift by a 1/2 pitch of the opening 1c corresponding to (T−Tb), the resolution can be improved to near T/(T−Tb) times as large as the sampling frequency $\omega s$. Specifically, since T=1 and Tb=0.5 in the present embodiment, the resolution can be improved to twice as large as the sampling frequency $\omega s$, and fourfold over the case where no pixel shift is performed. Furthermore, in the present embodiment, the conventional pixel shift of a 1/2 pixel pitch is also applied along the vertical direction.

Figure 7:
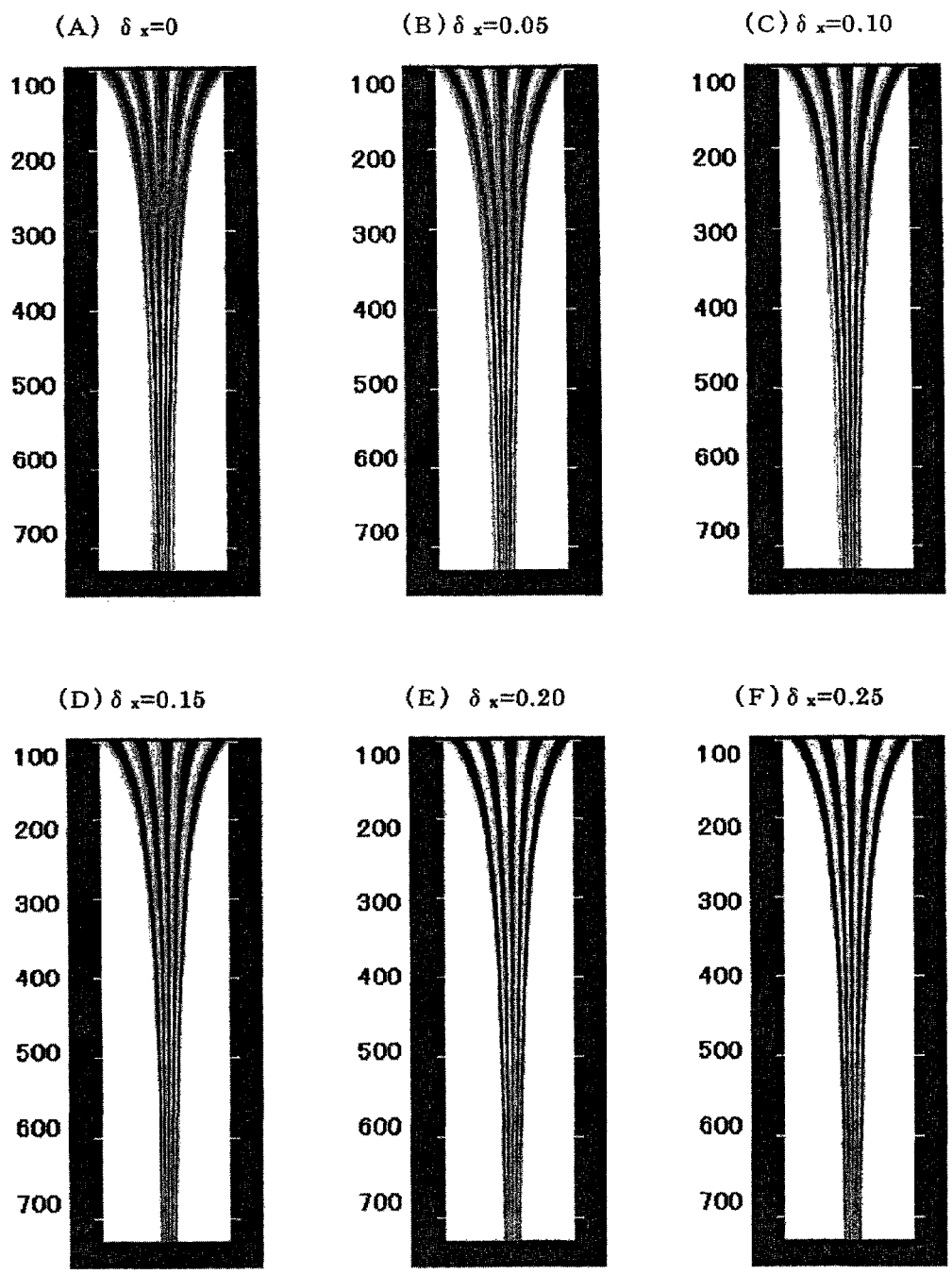
[FIG. 7] (A) to (F) are diagrams showing resolution results when a wedge-like resolution pattern is imaged, according to Embodiment 2 of the present invention

Next, results of a simulation where a wedge-like resolution pattern is imaged with a pixel-shift type imaging apparatus of the present embodiment are shown in FIG. 7. In this simulation, $\delta X$ was varied by units of 0.05, from 0 to 0.25. Moreover, a shift by 1 pixel was made along the vertical direction, and a pixel shift was made with the following horizontal pitches. The limit resolution along the horizontal direction in the case of not performing a pixel shift is set to 200 lines. In the present embodiment, $\delta X=0.25$. In this simulation, an image was displayed only with a signal obtained from the imaginary opening 1c.

The operation and signal processing of this pixel shift are repetitions of: (1) imaging 1; (2) a move along the vertical direction by 1 pixel; (3) imaging 2; (4) subtraction between the signal from imaging 1 and the signal from imaging 2; (5) a move along the vertical direction by a 1/2 pixel and performing processes (1) to (4); and (6) a horizontal pixel shift.

These simulation results indicate that, in (A) of the figure where $\delta X=0$, there is not much effect of the pixel shift. However, even in this case, since a 1/2 pitch pixel shift is applied along the vertical direction, the limit resolution is slightly improved to near 250 lines. On the other hand, (B) to (F) of the figure where $\delta X>0$, the resolution is extremely improved if $\delta X$ is not 0. In (F) of the figure where $\delta X=0.25$, the highest-definition image is obtained, such that the resolution is improved to near 700 lines.

Thus, according to Embodiment 2 of the present invention, two kinds of photodetecting portions with different opening ratios are respectively placed in every other row, and the opening right ends of the two kinds of photodetecting portions along the horizontal direction are placed at the same position, and from a difference in opening between two kinds of adjoining photodetecting portions along the vertical direction, one imaginary opening can be created. Then, with a pixel shift of this imaginary opening along the horizontal direction, there is provided an effect of obtaining a high-definition signal having an improved resolution along the horizontal direction.

According to Embodiment 2 of the present invention, a signal difference between the two pixels is created with a shift of 1 pixel along the vertical direction, i.e., by overlaying the photodetecting portions 1a and 1b. However, so long as there are no luminance changes along the vertical direction, a signal difference may be created between vertically adjoining pixels. Then, the resultant high definition signal may be utilized as it is, or subjected to a pixel summation so as to be added to a result of signal processing which has a low resolution but a high sensitivity, without losing its effect. In the pixel configuration, although the same photodetecting portions are in each row, there is no problem in swapping the photodetecting portions between the 1st row and 2nd column and the 2nd row and 2nd column within the basic construction shown in FIG. 6; moreover, concerning the positions of two kinds of photodetecting portions, the left ends of the openings may be aligned, instead of aligning the opening right ends. In addition, although the opening ratio of the photodetecting portions 1a is 100% in the above embodiment, this is not a limitation. Moreover, a configuration may be adopted in which a photodetecting portion having a broad opening and a photodetecting portion having a narrow opening are adjusted so that their total opening ratio is 200%; by doing so, the decrease in the overall sensitivity can also be prevented.

(Embodiment 3)

Figure 8:
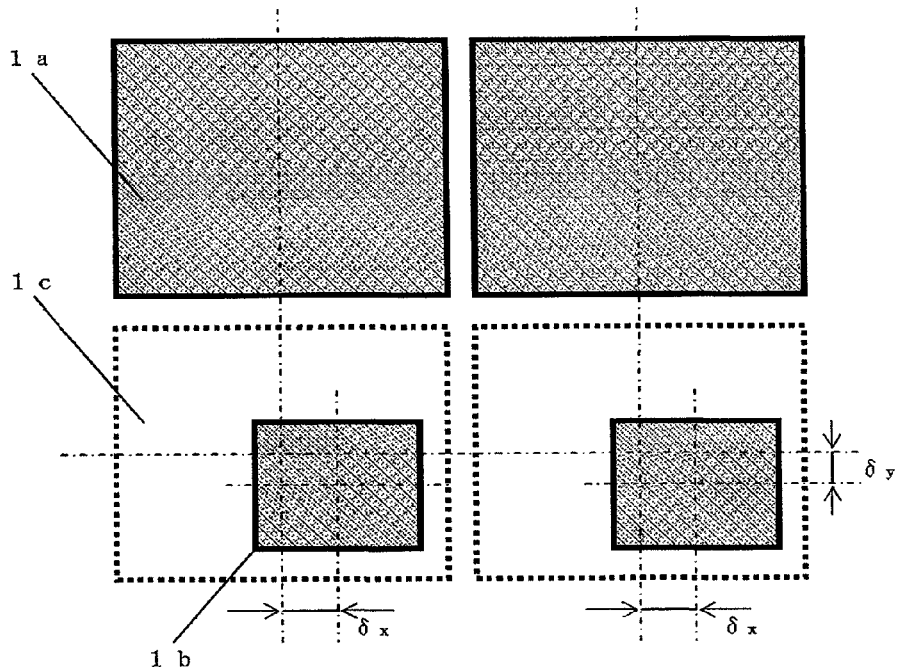
[FIG. 8] A plan view showing a basic two-row-by-two-column arrangement of imaging device photodetecting portions according to Embodiment 3 of the present invention

Next, with reference to FIG. 8, a third embodiment will be described. FIG. 8 is a plan view showing a basic arrangement of photodetecting portions according to Embodiment 3 of the present invention. Basic constructions of two rows by two columns are placed in a two-dimensional array. In this figure, photodetecting portions 1a having a high opening ratio (opening ratio 100%) are placed in the 1st row and the 1st column and in the 1st row and the 2nd column. Photodetecting portions 1a having a low opening ratio, whose opening is narrowed along the horizontal and vertical directions, are placed in the 2nd row and the 1st column and in the 2nd row and the 2nd column. Moreover, the relative positioning of a photodetecting portion 1a and a photodetecting portion 1b is such that: along the horizontal direction, the center of a photodetecting portion 1b is offset by δX from the center of a photodetecting portion 1a; and, along the vertical direction, the center of a photodetecting portion 1b is offset by δy from the center position of a photodetecting portion 1a being shifted by 1 pitch.

In the present embodiment, too, as in the two above-described Embodiments, the resolution along the horizontal direction can be improved with a difference in opening between a photodetecting portion 1a and a photodetecting portion 1b arrayed along the vertical direction. The present embodiment is characterized in that the centers of opening of the photodetecting portion 1a and the photodetecting portion 1b are shifted in two directions. In other words, the present embodiment differs from Embodiment 1 in that the opening of the photodetecting portions 1b is narrowed also along the vertical direction.

In the present simulation, the opening of the photodetecting portions 1b along the horizontal and vertical directions is set to a 1/2 pixel pitch. As a result, the opening ratio is 0.5×0.5=0.25. The imaging subject, the limit resolution conditions, and the pixel shift process are the same as those in Embodiment 2 above. The center position of each photodetecting portion 1b is shifted by δX and δy, respectively, along the horizontal and vertical directions from the center position of the unit pixel region. In this simulation, for simplicity, it is assumed that δX=δy, and δX is varied by units of 0.05, from 0 to 0.25.

Figure 10:
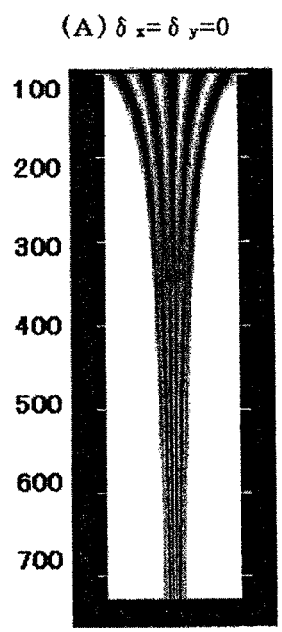
[FIG. 10] (A) to (F) are diagrams showing resolution results when a wedge-like resolution pattern is imaged, according to Embodiment 2 of the present invention
Figure 10:
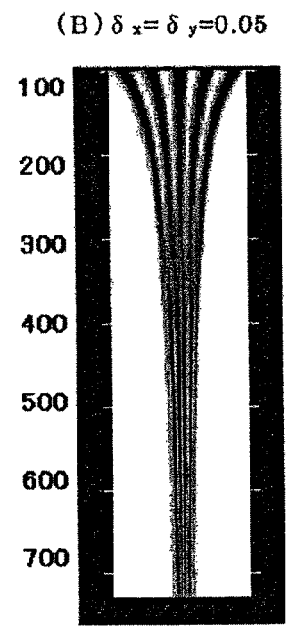
Figure 10:
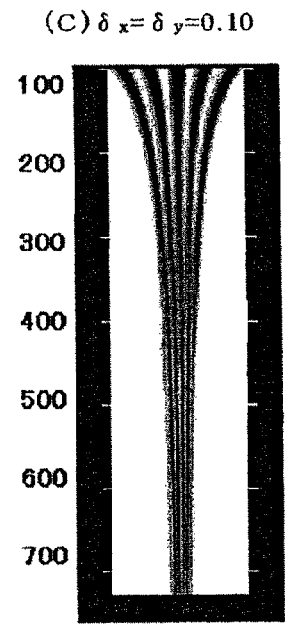
Figure 10:
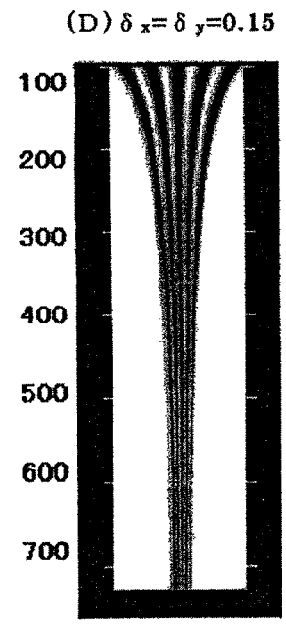
Figure 10:
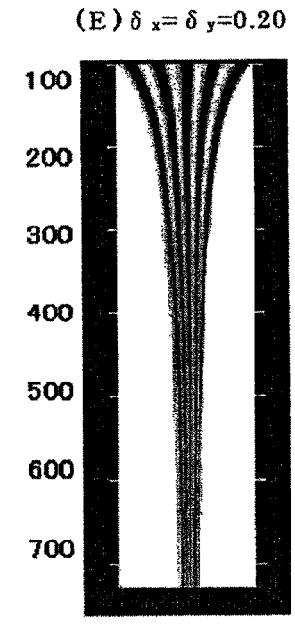
Figure 10:
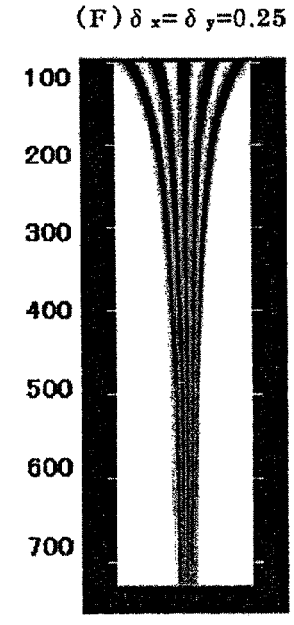

The simulation results are shown in FIG. 10. As shown in (A) of the figure, in the case where δX=δy=0, the resolution is not improved over the case of performing a conventional 1/2 pitch pixel shift, but the resolution is improved over Embodiment 2. When a vertical size difference (difference in opening) exists between two adjoining photodetecting portions 1a and 1b along the vertical direction, the resolution characteristics along the horizontal direction become better.

For δX=δy>0, simulation results are shown in (B) to (F) of the figure. It can be seen that, as in the case of Embodiments 1 and 2, the resolution is extremely improved. It can be seen that, particularly in the case where δX=δy=0.20, or where δX=δy=0.25, a resolution near 700 lines is obtained.

Figure 9:
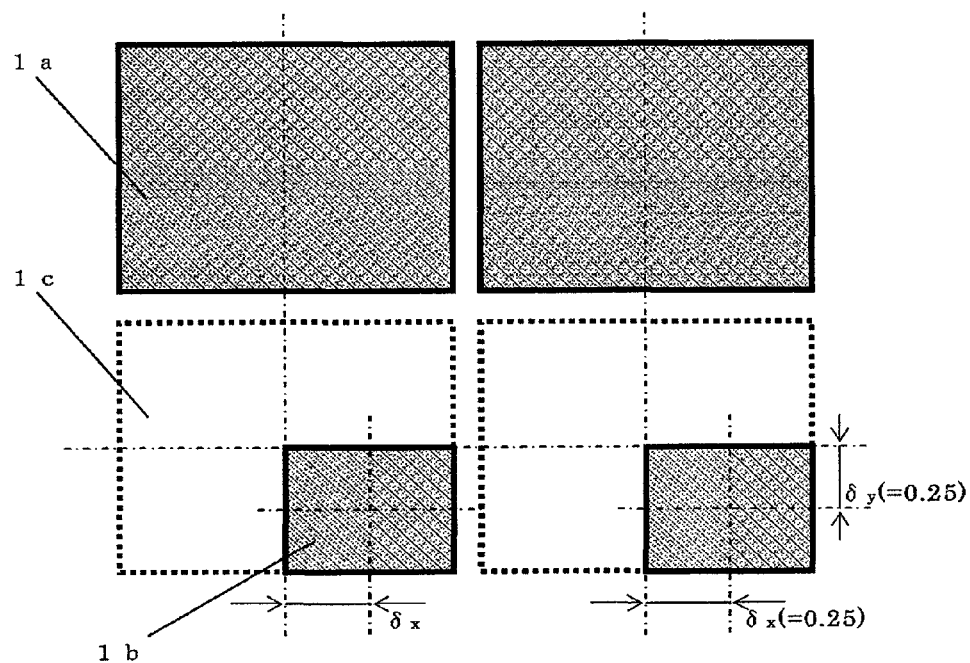
[FIG. 9] A plan view showing a basic arrangement of imaging device photodetecting portions in the case where the difference in position between photodetecting portions $1a$ and $1b$ is maximum, according to Embodiment 3 of the present invention
Figure 11:
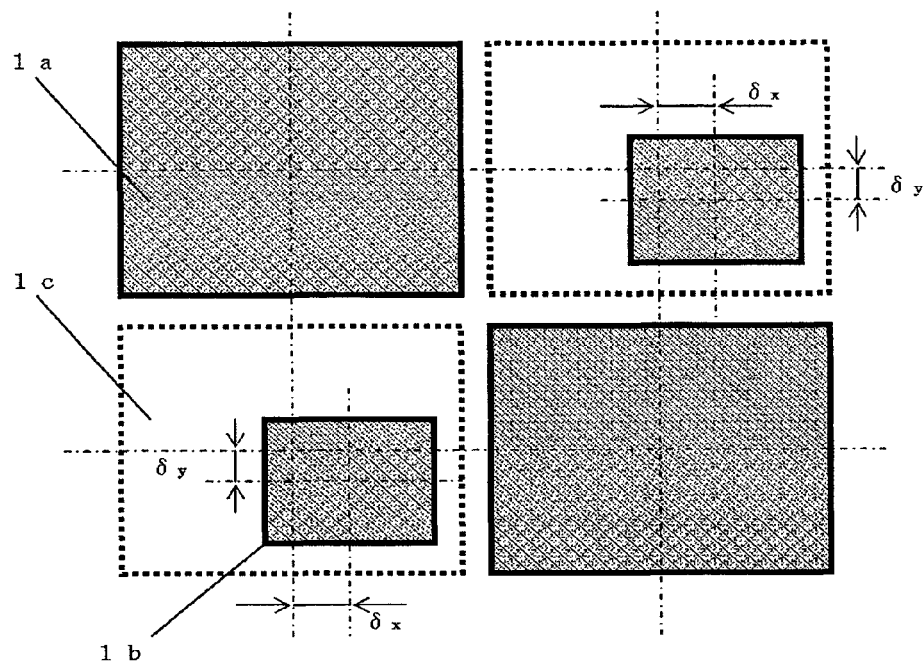
[FIG. 11] A plan view showing a basic arrangement of imaging device photodetecting portions in the case where photodetecting portions $1a$ and $1b$ are alternately arrayed two-dimensionally, according to Embodiment 3 of the present invention

There is a problem of lowered photosensitivity due to the reduced area of the photodetecting portions 1b. However, by narrowing the photodetecting portions 1b along the horizontal and vertical directions, and by maximizing the difference in position between a photodetecting portion 1a and a photodetecting portion 1b as shown in FIG. 9, the resolution can be greatly improved. Moreover, from these results, in order to improve the resolution simultaneously along the horizontal and vertical directions, a configuration (checker pattern) would also be conceivable where photodetecting portions 1a and photodetecting portions 1b are alternately arrayed two-dimensional as shown in FIG. 11.

Thus, according to Embodiment 3 of the present invention, two kinds of photodetecting portions with different opening ratios are respectively placed in every other row in such a manner that their centers of opening do not coincide, and the opening of the photodetecting portions having a low opening ratio is narrowed along the horizontal and vertical directions, whereby a high-definition signal having an improved resolution along the horizontal direction is obtained. Moreover, by arraying the pixels in the shape shown in FIG. 11, simultaneous improvements in the resolution along the horizontal and vertical directions are expectable.

(Embodiment 4)

Figure 12:
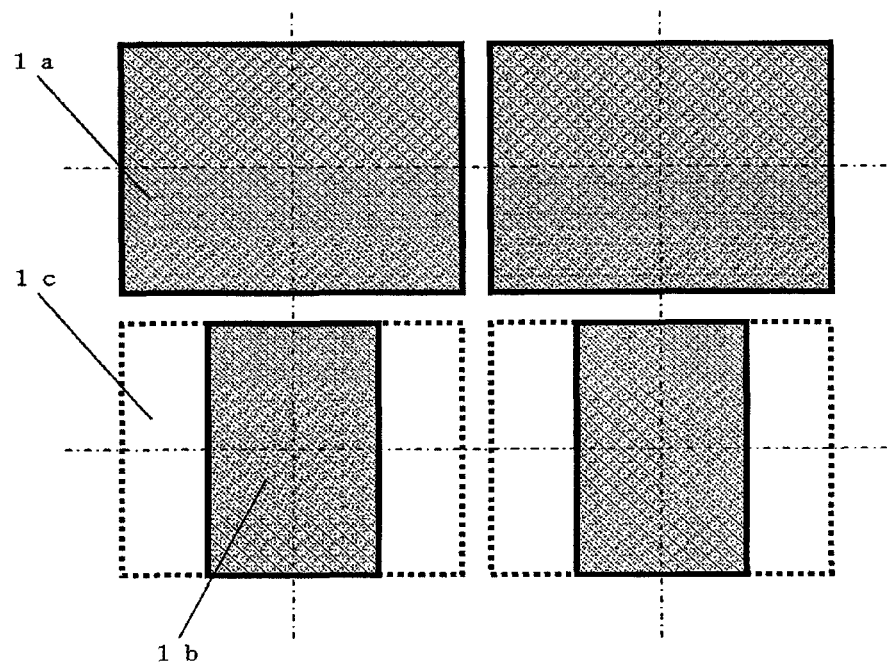
[FIG. 12] A plan view showing a basic two-row-by-two-column arrangement of imaging device photodetecting portions according to Embodiment 4 of the present invention

Next, with reference to FIG. 12, a fourth embodiment will be described. FIG. 12 is a plan view showing a basic arrangement of photodetecting portions according to Embodiment 4 of the present invention. In this figure, photodetecting portions 1a having a high opening ratio (opening ratio 100%) are placed in the 1st row and the 1st column and in the 1st row and the 2nd column. Photodetecting portions 1b having a low opening ratio, whose opening is narrowed along the horizontal direction and which have an opening ratio that is 1/2 of the opening ratio of the photodetecting portions 1a, are placed in the 2nd row and the 1st column and in the 2nd row and the 2nd column.

The photodetecting portions 1a and the photodetecting portions 1b are disposed so that the center of a photodetecting portion 1b and the center of a photodetecting portion 1a are at the same position along the horizontal direction. In other words, the photodetecting portions 1a and 1b are positioned so that, when a photodetecting portion 1a is shifted by the pixel pitch along the vertical direction, the center of the shifted photodetecting portion 1a and the center of a photodetecting portion 1b coincide.

Next, a high definition processing for an image according to the present embodiment will be described.

In the present embodiment, by obliquely shifting an image on the imaging surface, a high definition along the horizontal direction is obtained. In Embodiments 1 to 3 above, an image shift on the imaging surface is made separately through a vertical move or a horizontal move. In the present embodiment, an image shift on the imaging surface is made in an oblique direction. Moreover, the present embodiment is characterized in that the horizontal resolution is improved by utilizing not only differences in signals from two photodetecting portions with different opening ratios adjoining along the vertical direction (corresponding signals from imaginary pixels), but also signals (actual pixel signals) which are output from photodetecting portions having a relatively low opening ratio.

On an image basis, obliquely shifting an image on the imaging surface with the action of the pixel shift section corresponds to obliquely shifting the pixels. Therefore, in the following description, shifting an image on the imaging surface with the action of the pixel shift section will be expressed as "shifting the pixels".

In the present embodiment, since the pixels are to be shifted in an oblique direction, the pixel center along the horizontal direction (the X coordinate of the center of a photodetecting portion) may be identical between two adjoining pixels along the vertical direction. Specifically, when imaging a plurality of frames in succession, the pixels are to be obliquely shifted after completing the imaging for a certain frame and before performing the imaging for a next frame (current frame). Before beginning the imaging for the current frame, the pixels from 1 frame before are shifted by 1 pixel (1 pixel pitch) along the vertical direction, and by δs along the horizontal direction.

Signals from imaginary pixels are obtained by using results of subtraction between the image from 1 frame before and the current frame image, and also actual signals from the pixels having a relatively low opening ratio are acquired from the image from 1 frame before. By using these, a high-definition image is generated. Herein, assuming that the opening width of the photodetecting portion 1a along the horizontal direction is W1a and that the opening width of the photodetecting portion 1b along the horizontal direction is W1b, δs is expressed by eq. 16. In the present embodiment, W1a: W1b=2:1, and hence δs=W1a/4, this being a 1/4 of the horizontal pixel pitch.

$$\delta s = (W1a - W1b)/2 \quad [\text{eq. 16}]$$

Figure 13:
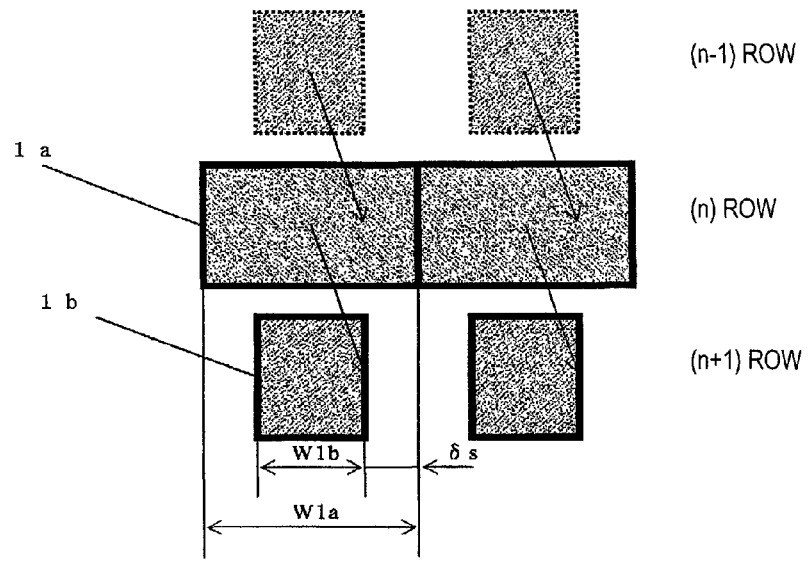
[FIG. 13] (A) is a plan view showing a basic construction around an $n^{th}$ row of arrayed pixels and a direction of move of pixels, according to Embodiment 4 of the present invention; (B) is a plan view showing pixels after the move being overlaid on pixels before the move, concerning pixels in an $n^{th}$ row and pixels in an $n+1^{th}$ row, according to Embodiment 4 of the present invention; and (C) is a timing chart showing pixel signals before and after the move and signals of imaginary pixels created from differences therebetween, according to Embodiment 4 of the present invention
Figure 13:
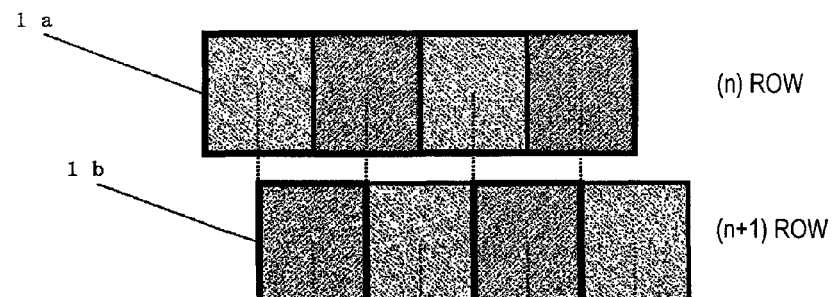
Figure 13:
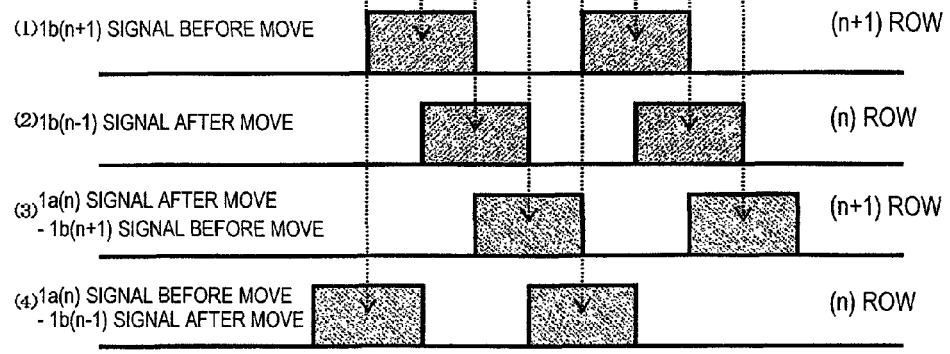

The method of shifting the pixels will be described with reference to FIG. 13. FIG. 13(A) shows a basic construction around an $n^{th}$ row of pixels in a two-dimensional array, as well as a direction of move of the pixels. FIG. 13(B) shows, concerning an $n^{th}$ row and an $n+1^{th}$ row, pixels after the move being overlaid on pixels before the move. Photodetecting portions having a high opening ratio completely cover the pixels having a low opening ratio. In each photodetecting portion having a high opening ratio, there is only one portion (non-overlapping region) that is not covering a photodetecting portion having a low opening ratio. This non-overlapping region functions as a light-receiving region of an imaginary pixel. The received light amount of this imaginary pixel corresponds to a difference between the signals obtained from the two photodetecting portions with different opening ratios. FIG. 13(C) shows pixel signals before and after a move of the pixels via a pixel shift, and signals of imaginary pixels created from differences therebetween. Herein, the pixel signals from the photodetecting portions 1a and 1b, if existing in an $n^{th}$ row before the pixel move, i.e., one 1 frame before, will be expressed as 1a(n) and 1b(n).

First, the photodetecting portions 1b are moved by 1 pixel pitch along the vertical direction, and by a 1/4 pixel pitch along the horizontal direction. As for this move along the horizontal direction, since the horizontal width of a photodetecting portion 1b is 1/2 of the horizontal pixel pitch, the move by a 1/4 pixel pitch merely amounts to a conventional 1/2 pitch pixel shift being realized in terms of a move and a time difference, as shown in FIG. 13(C) (1)(2). On the other hand, as for a photodetecting portion 1a, from a subtraction between a 1a(n) signal after the move and a 1b(n+1) signal before the move, an imaginary pixel signal based on a difference in opening between the photodetecting portion 1a and the photodetecting portion 1b is generated (FIG. 13(C)(3)).

From the relationship between the horizontal width of a photodetecting portion 1b and the amount of horizontal move, the present embodiment is equivalent to imaginarily creating a pixel having a 1/2 size along the horizontal direction, and obtaining a signal from this imaginary pixel. Moreover, from a subtraction between a 1a(n) signal before the move and a 1b(n−1) signal after the move, an imaginary pixel signal is similarly generated from a difference in opening between the photodetecting portion 1a and the photodetecting portion 1b (FIG. 13(C)(4)).

After all, a pixel shift of imaginary pixels due to a difference in opening between the photodetecting portions 1a and the photodetecting portions 1b is added to the pixel shift of the photodetecting portions 1b. As a result, a 1/2 pitch pixel shift of 1/2 size pixels is realized, whereby the horizontal resolution is enhanced fourfold.

In the present embodiment, the pixels having a low opening ratio and the imaginary pixels have the same horizontal opening. If they differ, the resolution is lowered due to pixels having the greater horizontal opening. In that case, if both pixels are further horizontally moved by a 1/2 opening of the pixels having the greater horizontal openings, a corresponding pixel shift effect is obtained, whereby deterioration in the resolution can be prevented.

Thus, according to Embodiment 4 of the present invention, two kinds of photodetecting portions with different opening ratios are provided, and by obliquely moving the pixels, imaginary pixels are created due to difference in opening between pixels. Then, a high-definition image signal is obtained from signals from these imaginary pixels and pixels having a low opening ratio.

Although Embodiment 4 of the present invention illustrates that the two kinds of photodetecting portions have opening ratios of 100% and 50%, these are not limitations. It suffices if there is a difference in opening between both photodetecting portions and if one kind of imaginary pixel can be created through a pixel move. Although it is illustrated the difference in opening between pixels exists only along the horizontal direction, this is not a limitation. A similar improvement in resolution can be obtained if a difference in opening is also provided along the vertical direction and if imaginary pixels can be created by also moving the pixels along that direction.

(Embodiment 5)

Figure 14:
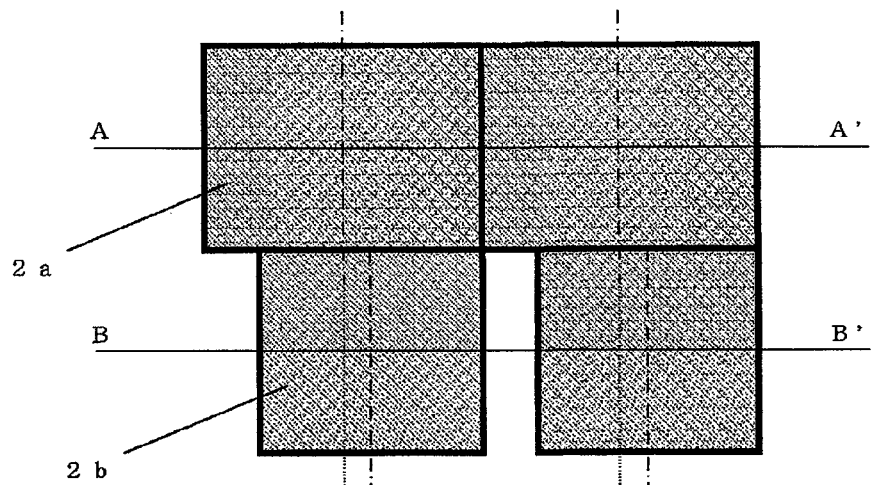
[FIG. 14] (A) is a plan view showing a relationship in the positioning of microlens which are provided over photodetecting portions, according to Embodiment 5 of the present invention; (B) is an AA' cross-sectional view of FIG. 14(A); and (C) is a BB' cross-sectional view of FIG. 14(B)
Figure 14:
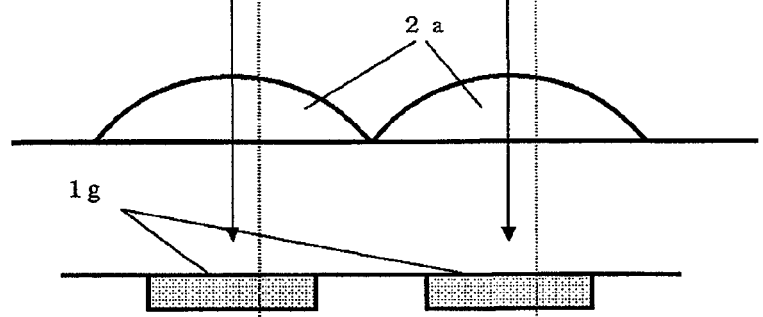
Figure 14:
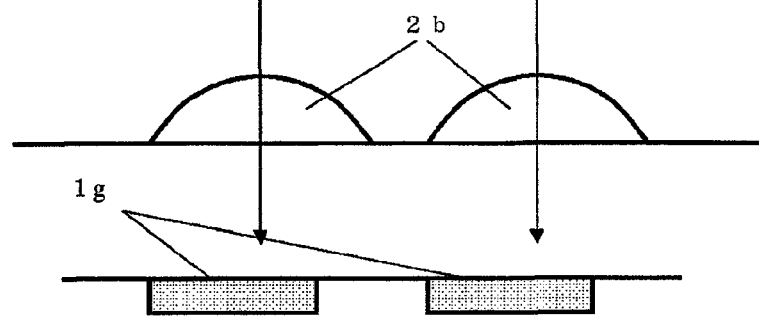

Next, with reference to FIG. 14, a fifth embodiment will be described. FIG. 14(A) is a plan view showing a part of a microlens array which is provided over photodetecting portions according to Embodiment 5 of the present invention. Although this microlens array has a multitude of microlenses in a two-dimensional array in actuality, its basic construction is a set of microlenses in two rows by two columns as shown in FIG. 14(A). FIG. 14(B) is a cross-sectional view at line AA' in FIG. 14(A). 14FIG. (C) is a cross-sectional view at line BB' in FIG. 14(A). In the set of four microlens shown in FIG. 14, microlenses 2a having a relatively high convergence rate and microlenses 2b having a relatively low convergence rate are placed so as to adjoin along the vertical direction. The right ends of both microlenses 2a and 2b are on the same line extending along the vertical direction. Photodetecting portions 1g for receiving light from the microlenses 2a and 2b and outputting it as electrical signals are regularly arrayed along the horizontal and vertical directions.

In the present embodiment, the microlenses 2a are positioned above the centers of opening of the photodetecting portions 1g, but the microlenses 2b are offset from the centers of opening of the photodetecting portions 1g along the horizontal direction. However, the offset is within a range such that the microlenses 2b are able to project all converged light onto the photodetecting portions 1g. With such a structure, i.e., a partially altered structure of the microlenses, the photodetecting portions of the imaging device can substantially create a difference in opening between photodetecting portions, despite their identical opening ratio. In terms of production steps, it is easier to thus alter the shape of the microlenses on the imaging device surface than alter the structure of the photodiodes which are the photodetecting portions. The reason is that, although there are large rises and falls on the surface when forming the openings of photodiodes, the surface will have become flat when producing the microlenses, so that their shapes are easy to control. Other than that, if openings of the photodetecting portions are increased in a direct manner, unfavorable influences may possibly occur on the imaging characteristics, e.g., smear.

Thus, according to this Embodiment 5, by altering the shape of the microlenses provided on the imaging device surface, it is possible to change the opening ratios of the photodetecting portions, thus providing an advantageous effect in terms of the production steps or characteristics of the imaging device.

Although Embodiment 5 is applied to the case where the region right ends of the photodetecting portions having a high opening ratio and the region right ends of the photodetecting portions having a low opening ratio coincide along the horizontal direction in Embodiment 1, this is not a limitation. In the cases of Embodiments 2 to 4 as well as in other cases, any imaging device that realizes a high definition by utilizing a difference in opening between photodetecting portions is applicable.

In Embodiment 1 to Embodiment 5 above, the present invention is applied under the premise that the photodetecting portions of the imaging device are arrayed along the horizontal and vertical directions. However, this is not a limitation; the present invention is also applicable to devices of an oblique array structure, e.g., an array which is tilted by 45 degrees or 135 degrees from horizontal. Although two kinds with different opening ratios have been illustrated as the photodetecting portions of the imaging device, this is not a limitation. Even if there are three or more kinds of opening ratios, it is possible to confer a high definition to an image so long as a difference in opening is created and signals from imaginary pixels are obtained.

(Embodiment 6)

Figure 17:
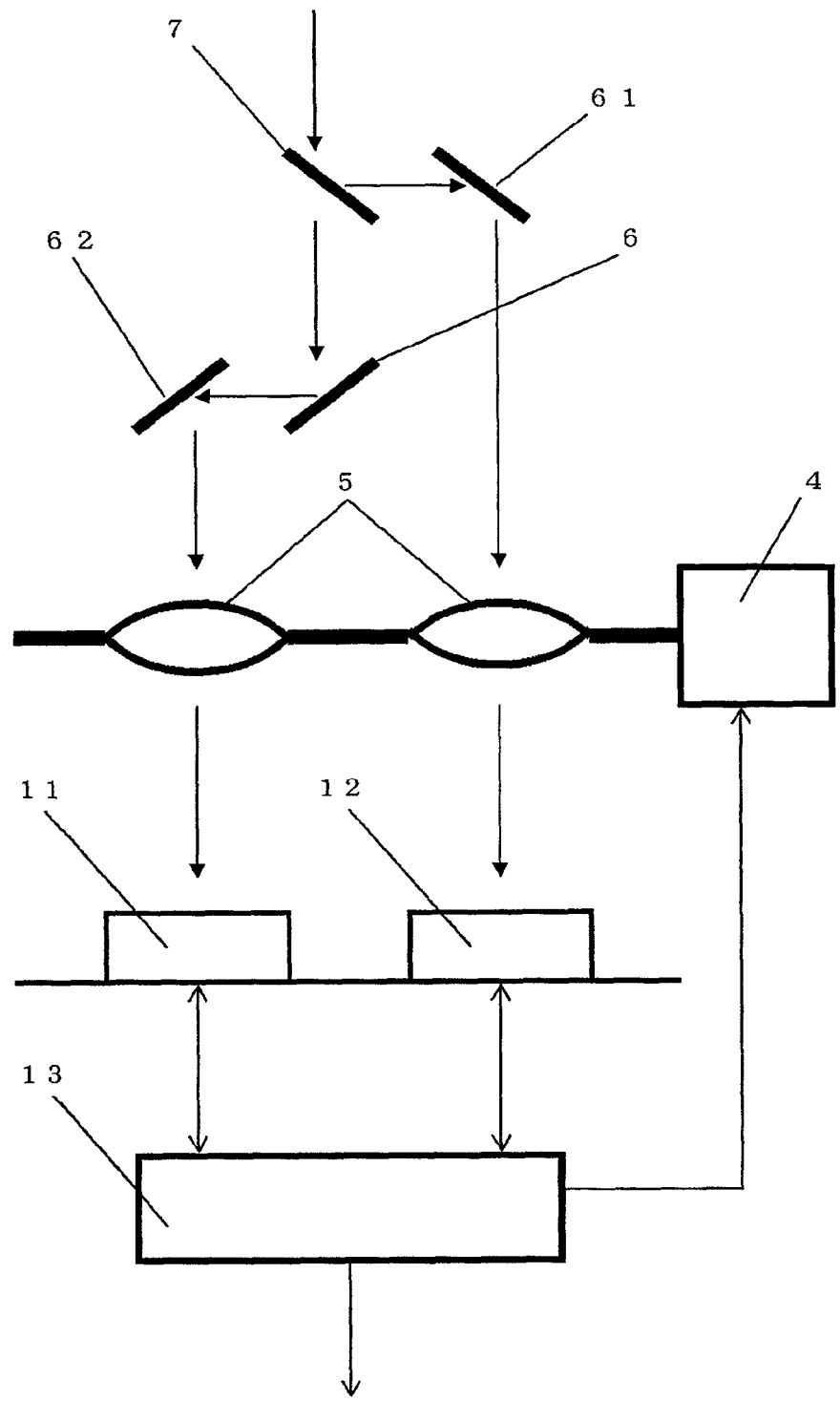
[FIG. 17] A diagram showing a basic construction according to Embodiment 6 of the present invention

FIG. 17 is a structural diagram of a pixel-shift type imaging apparatus based on two images according to Embodiment 6 of the present invention.

The pixel-shift type imaging apparatus of the present embodiment includes a first imaging system which performs imaging with a first definition, and a second imaging system which performs imaging with a second definition that is lower than the first definition. It further includes a matching means which associates a first image obtained by the first imaging system with a second image obtained by the second imaging system on a pixel-by-pixel basis, and a pixel shift means for causing a relative movement of the pixels with respect to optical imaging.

Hereinafter, the pixel-shift type imaging apparatus of the present embodiment will be described in more detail.

The apparatus of FIG. 17 includes a beam splitter 7 which splits light from a subject into two, and reflecting mirrors 6, 61, and 62 for guiding the split light onto the imaging surfaces of the two solid-state imaging devices.

Twin lenses 5, which comprise two lenses with identical optical characteristics, are placed in such a manner as to respectively cross the two split optical paths. The twin lenses 5 are coupled to a budging device 4 for budging the twin lenses 5 along the horizontal direction.

Except for having different numbers of pixels along the horizontal direction, the imaging devices 11 and 12 have entirely identical imaging characteristics, e.g., their number of pixels along the vertical direction and their light-receiving areas. In this example, the number of pixels of the imaging device 11 along the horizontal direction is 2M, whereas the number of pixels along the vertical direction is N. On the other hand, the number of pixels of the imaging device 12 along the horizontal direction is 3M, whereas the number of pixels along the vertical direction is N (where M and N are integers).

The imaging apparatus of the present embodiment includes a high definition signal generation device 3, which receives image signals from the imaging device 11 and the imaging device 12, and designates an amount of budging to the budging device 4 and generates a high-definition image signal.

Figure 18:
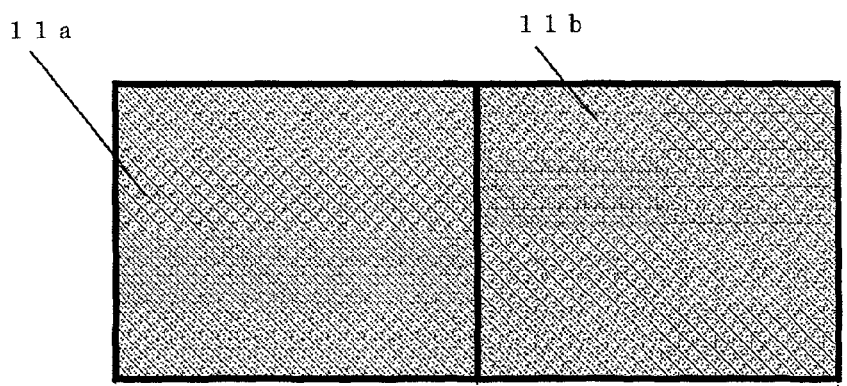
[FIG. 18] A plan view showing parts of pixel arrays of an imaging device 11 and an imaging device 12, according to Embodiment 6 of the present invention
Figure 18:
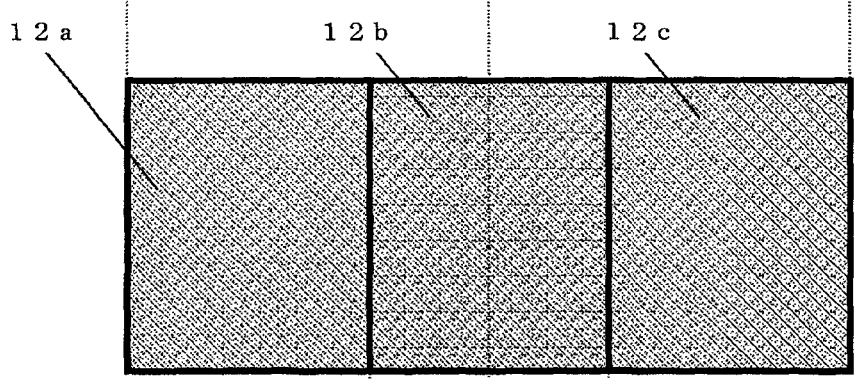
Figure 18:
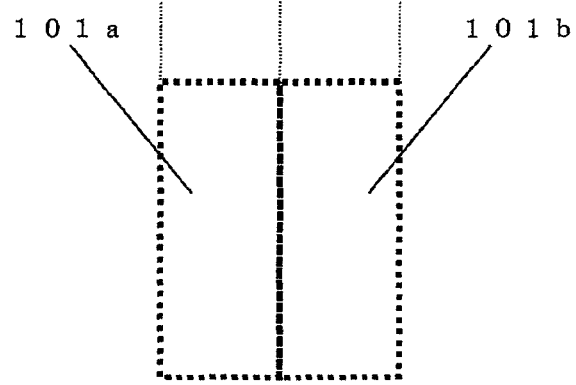

FIG. 18 is a plan view showing parts of pixel arrays of the imaging device 11 and the imaging device 12. In a relative manner, FIGS. 18(A) and (B) respectively show pixel sizes of the imaging devices along the horizontal direction. FIG. 18(A) shows pixels 11a and 11b of the imaging device 11. (B) of the figure shows pixels 12a, 12b, and 12c of the imaging device 12.

The number of horizontal pixels of the imaging device 11 is smaller than the number of horizontal pixels of the imaging device 12. However, each pixel of the imaging device 11 has a broad opening region along the horizontal direction. In the present embodiment, the number of horizontal pixels of the imaging device 11 is 2M (2 million), whereas the number of horizontal pixels of the imaging device 12 is 3M (3 million). On the other hand, the opening ratios of the pixels 11a and 11b of the imaging device 11 are 1.5 times as large as the opening ratios of the pixels of the imaging device 12.

FIG. 18(C) shows differences in opening between the pixels of the imaging devices. A region 101a represents a difference in opening between a pixel 11a and a pixel 12a, whereas a region 101b represents a difference in opening between a pixel 11b and a pixel 12c. Herein, assuming that the imaging device 11 and the imaging device 12 have imaged the same subject with the same angle of view, a difference signal between the photoelectric conversion signal from a pixel 11a and a photoelectric conversion signal from a pixel 12a can be regarded as a photoelectric conversion signal of the region 101a serving as an imaginary pixel. In other words, the regions 101a and 101b function as imaginary pixels.

Next, an operation of the pixel-shift type imaging apparatus based on two images of the present embodiment will be described.

When a subject is imaged by using the imaging apparatus having the configuration of FIG. 17 and FIG. 18, light from the subject is split into two by the beam splitter 7 first. The light enters the twin lenses 5, one via the reflecting mirror 61, and the other via the reflecting mirrors 6 and 62. Herein, positioning of these instruments is set so that the optical path length from the beam splitter 7 via the reflecting mirror 61 to the twin lenses 5 and the optical path length from the beam splitter 7 via the reflecting mirrors 6 and 62 to the twin lenses 5 are equal.

The two of the subject light respectively form images on the light-receiving surfaces of the imaging device 11 and the imaging device 12 via the twin lenses 5, and are subjected to photoelectric conversions by the two imaging devices.

Note that, as for the relative positions of the two imaging devices with respect to imaging, the horizontal positions of the reflecting mirror 61 or 62 are fine-adjusted so that two pixels of the imaging device 11 and three pixels of the imaging device 12 have zero horizontal phase difference, as shown in FIG. 18.

The image signals from the imaging device 11 and the imaging device 12 are input to the high definition signal generation device 13, where the image signal from the imaging device 11 is stored to an image memory 1 and the image signal from the imaging device 12 is stored to an image memory.

In the high definition signal generation device 13, a summation of the horizontal two pixel signals in the first image memory and a summation of the horizontal three pixel signals in the second image memory are performed, and by using all of these, matching and other signal processing for the two images are performed. The other signal processing is a budging instructing process for the budging device 4, an imaging instruction process for the imaging devices 11 and 12, and a high definition signal generation process.

Figure 19:
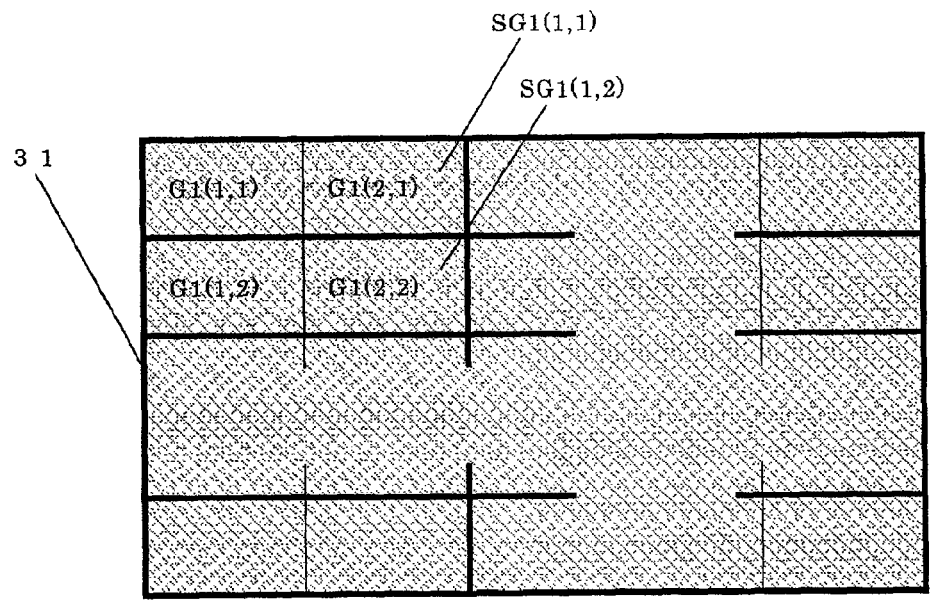
[FIG. 19] (A) is a diagram showing how pixel signals are arrayed in a first image memory 31; and (B) is a diagram showing how pixel signals are arrayed in a second image memory 32
Figure 19:
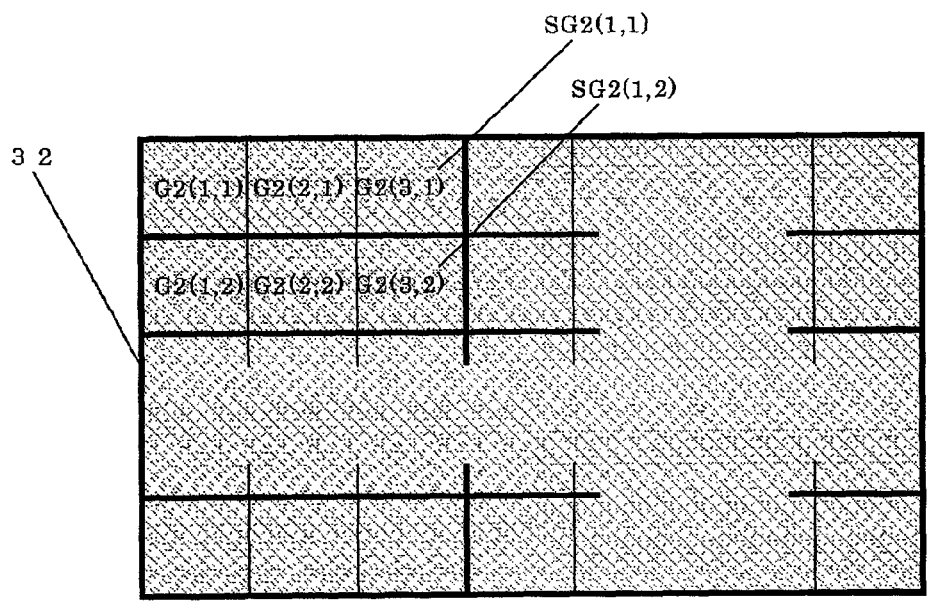
Figure 20:
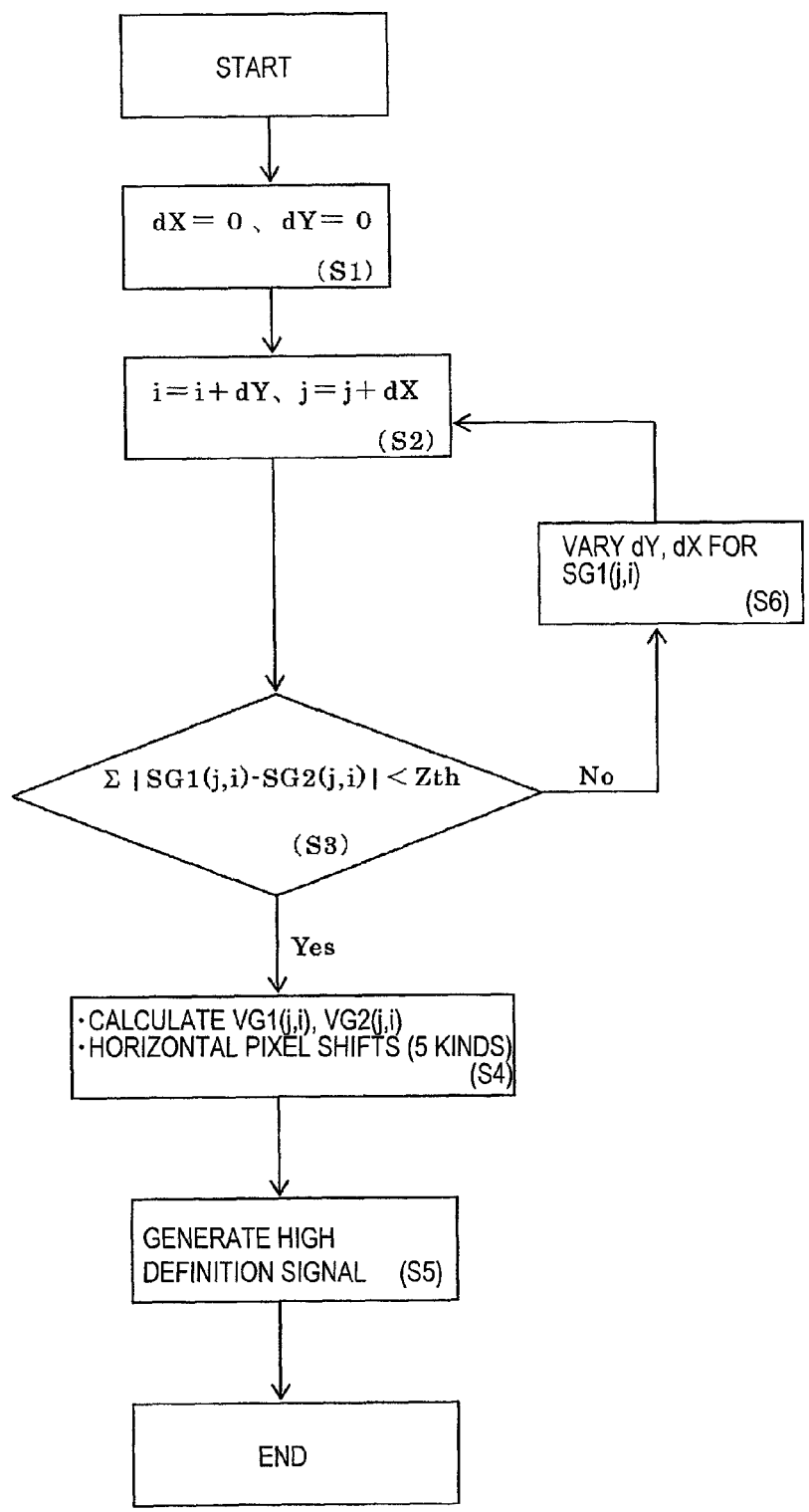
[FIG. 20] A flowchart showing a matching process between two images and other signal processing

FIG. 19(A) shows how pixel signals are arrayed in the first image memory 31. On the other hand, FIG. 19(B) shows how pixel signals are arrayed in the second image memory 32. FIG. 20 is a flowchart of a matching process between two images and the other signal processing. Herein, a summation signal of horizontal two pixel signals G1(2*j*−1, i), G1(2*j*,i) in the image memory 1 is SG1(*j,i*), and a summation signal of horizontal three pixel signals G2(3*j*−2, i), G2(3*j*−1, i), G2(3*j*, i) in the image memory 2 is SG2(*j,i*).

In the flowchart shown in FIG. 20, it is assumed that the offset amount between the two images along the horizontal direction is dX and that their offset amount along the vertical direction is dY. When starting the process, dX=0, dY=0 (S1), and i=i+dY, j=j+dX (S2).

Next, a difference between the summation signals SG1(*j,i*) and SG2(*j,i*) is taken, and the summation results for all data are subjected to a comparison against a value Zth which is previously set (S3). If the comparison result is Yes, a signal VG1(*j,i*) of the imaginary pixel 101*a* is calculated from eq. 6, and a signal VG2(*j,i*) of the imaginary pixel 101*b* is calculated from eq. 7.

Figure 21:
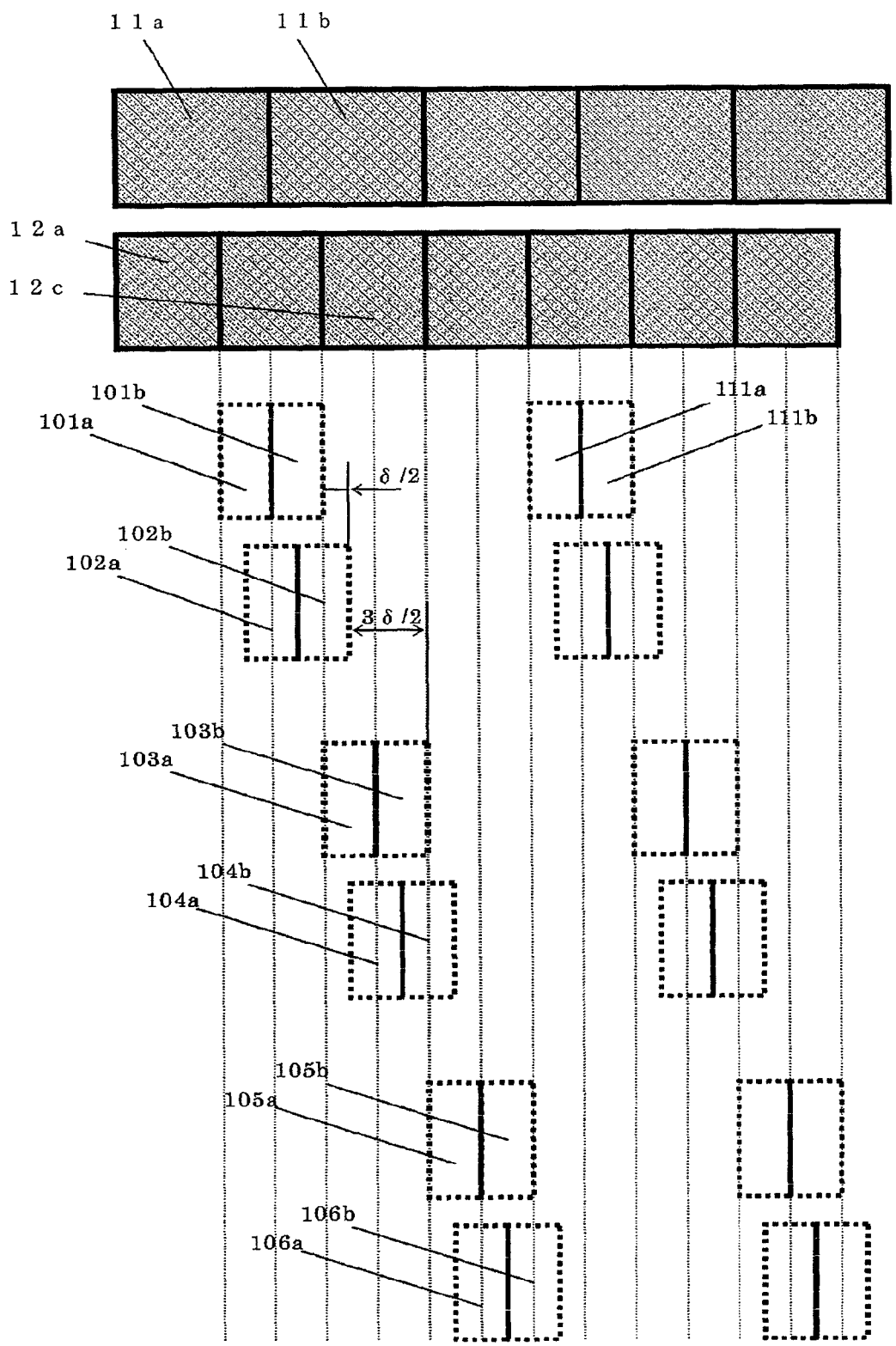
[FIG. 21] A diagram showing pixel shifts according to Embodiment 6 of the present invention

Thereafter, while performing the following five horizontal pixel shift processes, signals of imaginary pixels are consecutively created (S4). Since these created imaginary pixel signals have a narrow opening (δ) along the horizontal direction, and pixel shifts are performed at a 1/2 pitch and 3/2 pitches thereof, a high definition signal is obtained (S5). This operation is shown in FIG. 21. This pixel shift situation is equivalent to the imaginary pixels being densely arrayed along the horizontal direction and further performing a pixel shift by a 1/2 pitch.

$$VG1(j,i)=G1(2j-1,i)-G2(3j-2,i) \quad \text{[eq. 6]}$$

$$VG2(j,i)=G1(2j,i)-G2(3j,i) \quad \text{[eq. 7]}$$

Horizontal pixel shift process 1:
[1] For the budging device 4, an instruction to move δ/2 along the horizontal direction
[2] Receive image signals from the imaging devices 11 and 12
[3] Create signals of imaginary pixels 102*a* and 102*b*
Horizontal pixel shift process 2:
[4] For the budging device 4, an instruction to move 3δ/2 along the horizontal direction
[5] Receive image signals from the imaging devices 11 and 12
[6] Create signals of imaginary pixels 103*a* and 103*b*
Horizontal pixel shift process 3:
[7] For the budging device 4, an instruction to move δ/2 along the horizontal direction
[8] Receive image signals from the imaging devices 11 and 12
[9] Create signals of imaginary pixels 104*a* and 104*b*
Horizontal pixel shift process 4:
[10] For the budging device 4, an instruction to move 3 δ/2 along the horizontal direction
[11] Receive image signals from the imaging devices 11 and 12
[12] Create signals of imaginary pixels 105*a* and 105*b*
Horizontal pixel shift process 5:
[13] For the budging device 4, an instruction to move δ/2 along the horizontal direction
[14] Receive image signals from the imaging devices 11 and 12
[15] Create signals of imaginary pixels 106*a* and 106*b*

If the comparison result is No, it means that the two images are not in place. Therefore, in the data in the image memory 1, dX and dY are incremented by one or decremented by one (S6), and the above process is repeated. Instead of the image memory 1, the image memory 2 may be taken care of.

In the present embodiment, the numbers of pixels of the imaging device 11 and the imaging device 12 along the horizontal direction are 2:3, so that imaginary pixels with a 1/3 opening as compared to the imaging device 11 are being obtained. If these imaginary pixels are densely arrayed along the horizontal direction, the resolution will be improved threefold for the imaging device 11, and twofold for the imaging device 12. Since it is further equivalent to performing a 1/2 pitch pixel shift, the resolution is improved twofold from there. Consequently, the resolution is improved sixfold over the case of only employing the imaging device 11, and fourfold over the case of only employing the imaging device 12.

Thus, according to Embodiment 6 of the present invention, there is provided an apparatus which performs imaging in at least two kinds of imaging systems with different imaging definitions, and if the definitions of the two imaging systems along the horizontal direction are 2:3, the resolution is improved from fourfold to sixfold by performing pixel shifts by 1/2 and 3/2 of the horizontal pixel pitches of the imaginary pixels, thus providing effects which do not belong to the conventional techniques. In other words, imaginary pixels which are created from a slight difference in opening realize a large improvement in resolution.

The present embodiment employs the following conditions. However, these are not limitations.
(1) Although imaging systems are employed in which the imaging devices differ only in their horizontal resolutions, they may differ in their vertical resolution.
(2) Although imaging systems are employed in which the imaging devices differ only in their horizontal resolutions, even if they differ in their horizontal and vertical resolutions, the effects of a difference in opening are obtained by performing pixel shifts at 1/2 and 3/2 pitches of the imaginary pixels along an oblique direction.

(3) Although imaging systems are employed in which the resolutions of the imaging devices differ, the resolutions of the optical systems may differ instead.

(4) Although the definitions of the two imaging systems are 2:3, any other integer ratio n:m may be used. In particular, if n and m have large values, with a small difference therebetween, a large resolution will be obtained.

(5) Although two imaging systems are employed, three or more with different definitions may be employed.

Note that cameras having two or more imaging systems are under development for imaging of stereoscopic images. It is easy to apply such cameras to the present invention.

Industrial Applicability

A solid-state imaging apparatus according to the present invention is effective for all cameras, e.g., cameras for consumer use in which solid-state imaging devices are used, so-called digital cameras and digital camcorders, solid-state cameras for broadcasting, and solid-state monitor cameras for industrial use including night vigilance.

Reference Signs List 1 unit pixel region
1a photodetecting portion (photodiode) having a broad opening
1b photodetecting portion having a narrow opening
1c photodetecting portion
1c, 1d, 1e, 1f imaginary opening
2a microlens having a high convergence rate
2b microlens having a low convergence rate
11 imaging device
11a, 11a pixel
11b pixel
12 imaging device
12a, 12b, 12c pixel

The invention claimed is:

1. A pixel-shift type imaging apparatus comprising:
a solid-state imaging device;
an optical system for forming an image on an imaging surface of the solid-state imaging device;
a pixel shift section for shifting a position of the image on the imaging surface; and
a video signal processing section for processing an electrical signal output from the solid-state imaging device, wherein,
the solid-state imaging device includes
a plurality of unit pixel regions being arrayed on the imaging surface at a first pixel pitch along a first direction, and at a second pixel pitch along a second direction which intersects the first direction;
one of two adjoining unit pixel regions along the first direction includes a first photodetecting portion having a first opening ratio, and the other of the two unit pixel regions includes a second photodetecting portion having a second opening ratio which is lower than the first opening ratio;
the first photodetecting portion outputs a first pixel signal which is in accordance with an amount of light entering the first photodetecting portion, and the second photodetecting portion outputs a second pixel signal which is in accordance with an amount of light entering the second photodetecting portion;
when the first photodetecting portion is moved imaginarily by the first pixel pitch along the first direction, the first photodetecting portion covers the entire second photodetecting portion, and a portion of the imaginarily-moved first photodetecting portion that does not cover the second photodetecting portion functions as an imaginary third photodetecting portion; and
from a difference between the first pixel signal and the second pixel signal, the video signal processing section obtains an imaginary pixel signal which is in accordance with an amount of light entering the imaginary third photodetecting portion.

2. The pixel-shift type imaging apparatus of claim 1, wherein, when the first photodetecting portion is shifted by the first pixel pitch along the first direction, a center of the second photodetecting portion is offset by a distance $\delta$ from a center of the shifted first photodetecting portion along the second direction.

3. The pixel-shift type imaging apparatus of claim 2, wherein one of two edges of the second photodetecting portion that are parallel to the first direction is on one of lines which are extensions in the first direction of two edges of the first photodetecting portion that are parallel to the first direction.

4. The pixel-shift type imaging apparatus of claim 2, wherein the pixel shift section shifts the position of the image on the imaging surface along the second direction by a distance which is equal to or greater than a half of the distance $\delta$.

5. The pixel-shift type imaging apparatus of claim 4, wherein the pixel shift section shifts the position of the image on the imaging surface along the second direction by a distance which is equal to or less than a half of the second pixel pitch.

6. The pixel-shift type imaging apparatus of claim 5, wherein the pixel shift section shifts the position of the image on the imaging surface along the second direction by a distance which is equal to or less than a half of a width of the second photodetecting portion.

7. The pixel-shift type imaging apparatus of claim 1, wherein the pixel shift section shifts the position of the image on the imaging surface along the first direction by a half of the first pixel pitch.

8. The pixel-shift type imaging apparatus of claim 1, wherein the pixel shift section shifts the position of the image on the imaging surface along the first direction, alternately by the first pixel pitch or by a half of the first pixel pitch.

9. The pixel-shift type imaging apparatus of claim 1, wherein the pixel shift section shifts the position of the image on the imaging surface in a direction which is oblique to both the first direction and the second direction.

10. The pixel-shift type imaging apparatus of claim 1, wherein, when the first photodetecting portion is shifted by the first pixel pitch along the first direction, a center of the second photodetecting portion is offset from a center of the shifted first photodetecting portion by $\delta X$ along the second direction and by $\delta Y$ along the first direction.

11. The pixel-shift type imaging apparatus of claim 10, wherein the pixel shift section shifts the position of the image on the imaging surface, by a distance Y1 which is equal to or greater than a half of the distance $\delta Y$ and equal to or less than a half of the first pixel pitch along the first direction, and by a distance X1 which is equal to or greater than a half of the distance $\delta X$ and equal to or less than a half of the second pixel pitch along the second direction.

12. The pixel-shift type imaging apparatus of claim 11, wherein the pixel shift section shifts the position of the image on the imaging surface, by the distance Y1 plus the first pixel pitch along the first direction, and by the distance X1 plus the second pixel pitch along the second direction.

13. The pixel-shift type imaging apparatus of claim 1, wherein,
the first photodetecting portion and the second photodetecting portion are placed so that a center of the second photodetecting portion coincides with a center of the shifted first photodetecting portion when the first photodetecting portion is shifted by the first pixel pitch along the first direction;
the pixel shift section shifts the position of the image on the imaging surface in a third direction which is oblique to both the first direction and the second direction;
with the shift along the third direction by the pixel shift section, the first photodetecting portion covers the entire second photodetecting portion, and a portion of the first photodetecting portion that does not cover the second photodetecting portion is formed in only one region, the region functioning as an imaginary pixel; and
the video signal processing section generates a high definition signal based on differences between the first pixel signal and the second pixel signal obtained before and after the shift by the pixel shift section and on the second pixel signal.

14. The pixel-shift type imaging apparatus of claim 13, wherein, assuming that a width of the first photodetecting portion along the second direction is W1$a$ and that a width of the second photodetecting portion along the second direction is W1$b$, the shift by the pixel shift section along the third direction causes the position of the image on the imaging surface to move along the first direction, and also move by a distance defined as (W1$a$−W1$b$)/2 along the second direction.

15. The pixel-shift type imaging apparatus of claim 13, wherein, assuming that a length of the first photodetecting portion along the first direction is T1$a$ and that a length of the second photodetecting portion along the first direction is T1$b$, the shift by the pixel shift section along the third direction causes the position of the image on the imaging surface to move by distance defined as (T1$a$−T1$b$)/2 along the first direction and also move along the first direction.

16. The pixel-shift type imaging apparatus of claim 10, wherein,
assuming that a width of the first photodetecting portion along the second direction is W1$a$ and that a width of the second photodetecting portion along the second direction is W1$b$ (W1$a$>W1$b$), when W1$b$ is not equal to W1$a$/2, the pixel shift section shifts the position of the image on the imaging surface by W1$a$/2 along the second direction, in addition to the shift along the third direction.

17. The pixel-shift type imaging apparatus of claim 10, wherein the pixel shift section periodically repeats shifts along the third direction.

18. The pixel-shift type imaging apparatus of claim 1, wherein the solid-state imaging device has an array of microlenses for adjusting opening ratios and positions of the first photodetecting portion and the second photodetecting portion.

19. A solid-state imaging device having a plurality of unit pixel regions being arrayed on an imaging surface at a first pixel pitch along a first direction, and at a second pixel pitch along a second direction which intersects the first direction, wherein,
one of two adjoining unit pixel regions along the first direction includes a first photodetecting portion having a first opening ratio, and the other of the two unit pixel regions includes a second photodetecting portion having a second opening ratio which is lower than the first opening ratio;
the first photodetecting portion outputs a first pixel signal which is in accordance with an amount of light entering the first photodetecting portion, and the second photodetecting portion outputs a second pixel signal which is in accordance with an amount of light entering the second photodetecting portion; and
when the first photodetecting portion is moved imaginarily by the first pixel pitch along the first direction, the first photodetecting portion covers the entire second photodetecting portion.

20. The solid-state imaging device of claim 19, wherein,
a portion of the first photodetecting portion moved imaginarily by the first pixel pitch along the first direction that does not cover the second photodetecting portion functions as an imaginary third photodetecting portion; and
an imaginary pixel signal which is in accordance with an amount of light entering the imaginary third photodetecting portion is obtained from a difference between the first pixel signal and the second pixel signal.

21. The solid-state imaging device of claim 19, wherein the first photodetecting portion and the second photodetecting portion are positioned so that, when the first photodetecting portion is shifted by the first pixel pitch along the first direction, a center of the shifted first photodetecting portion does not coincide with a center of the second photodetecting portion.

22. The solid-state imaging device of claim 19, wherein, when the first photodetecting portion is shifted by the first pixel pitch along the first direction, a center of the second photodetecting portion is offset by a distance δ from a center of the shifted first photodetecting portion along the second direction.

23. The solid-state imaging device of claim 22, wherein, when the first photodetecting portion is shifted by the first pixel pitch along the first direction, a line connecting the center of the shifted first photodetecting portion and the center of the second photodetecting portion is not parallel to the first direction.

24. A pixel-shift type imaging apparatus comprising:
a splitter for splitting light from a subject to at least two optical paths including a first optical path and a second optical path;
a first solid-state imaging device for performing imaging at a first definition, with light traveling through the first optical path;
a second solid-state imaging device for performing imaging at a second definition which is higher than the first definition, with light traveling through the second optical path;
matching means for associating a first image obtained by the first solid-state imaging device with a second image obtained by the second solid-state imaging device on a pixel-by-pixel basis;
a pixel shift section for shifting a position of an image on an imaging surface of each solid-state imaging device, wherein,
pixel regions based on differences in opening between pixels as associated by the matching means are defined as imaginary pixels, and an amount of move of the imaginary pixels by the pixel shift section includes a 1/2 pitch or 3/2 pitches of the imaginary pixels.

25. The pixel-shift type imaging apparatus of claim 24, wherein,
the first imaging device includes pixels being arrayed with a first density; and
the second imaging device includes pixels being arrayed with a second density which is higher than the first density.

26. The pixel-shift type imaging apparatus of claim 24, comprising
a first optical system having a first magnification in the first optical path, and
a second optical system having a magnification which is smaller than the first magnification in the second optical path.

27. The pixel-shift type imaging apparatus of claim 24, wherein the first definition: the second definition is n:m (where n and m are different positive integer; n<m).

28. The pixel-shift type imaging apparatus of claim 24, wherein the amount of move of the imaginary pixels is 1/2 times as large as a pitch of the imaginary pixels along a direction of move.

29. The pixel-shift type imaging apparatus of claim 24, wherein the amount of move of the imaginary pixels is 1/2 times, or 1/2 times and 3/2 times as large as a pitch of the imaginary pixels in a direction of move.

* * * * *